(12) United States Patent
Suzuki

(10) Patent No.: US 9,718,976 B2
(45) Date of Patent: Aug. 1, 2017

(54) INK COMPOSITION FOR INKJET RECORDING, INKJET RECORDING METHOD, AND PRINTED MATTER

(71) Applicant: FUJIFILM CORPORATION, Minato-ku, Tokyo (JP)

(72) Inventor: Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 197 days.

(21) Appl. No.: 14/852,631

(22) Filed: Sep. 14, 2015

(65) Prior Publication Data
US 2016/0090495 A1   Mar. 31, 2016

(30) Foreign Application Priority Data

Sep. 26, 2014   (JP) .................. 2014-197311

(51) Int. Cl.
| | | |
|---|---|---|
| *C09D 11/101* | (2014.01) | |
| *C09D 11/30* | (2014.01) | |
| *B05D 3/06* | (2006.01) | |
| *C09D 11/00* | (2014.01) | |
| *C09D 11/10* | (2014.01) | |
| *C09D 11/102* | (2014.01) | |

(52) U.S. Cl.
CPC .............. *C09D 11/30* (2013.01); *C09D 11/00* (2013.01); *C09D 11/10* (2013.01); *C09D 11/101* (2013.01); *C09D 11/102* (2013.01)

(58) Field of Classification Search
CPC .................................................. C09D 11/101
See application file for complete search history.

(56) References Cited

U.S. PATENT DOCUMENTS 8,939,543 B2 *   1/2015   Yokoi .................. C09D 11/101
                                                                          347/20

FOREIGN PATENT DOCUMENTS

| JP | 2009-67955 A | 4/2009 |
|---|---|---|
| JP | 2010-001437 A | 1/2010 |
| JP | 2013-082916 A | 5/2013 |

OTHER PUBLICATIONS

English language translation of the following: Office action dated Oct. 4, 2016 from the JPO in a Japanese patent application No. 2014-197311 corresponding to the instant patent application. This office action translation is submitted now in order to supplement the understanding of the cited references which are being disclosed in the instant Information Disclosure Statement.

* cited by examiner

*Primary Examiner* — Vu A Nguyen
(74) *Attorney, Agent, or Firm* — Solaris Intellectual Property Group, PLLC

(57) ABSTRACT

An ink composition for inkjet recording includes a (meth) acrylic resin, a polymerization initiator, and a polymerizable compound. The (meth)acrylic resin includes a skeleton structure derived from a multifunctional thiol that is trifunctional to hexafunctional, and plural polymer chains connected to the skeleton structure by a sulfide bond, each of the plural polymer chains including at least two kinds of (meth) acrylic repeating units selected from the group consisting of a repeating unit derived from a (meth)acrylate having a $C_1$-$C_8$ linear, $C_3$-$C_8$ branched, $C_3$-$C_8$ alicyclic, or $C_6$-$C_8$ aromatic hydrocarbon group which may include an oxygen atom, a repeating unit derived from a (meth)acrylate having a $C_9$-$C_{10}$ alicyclic hydrocarbon group, and a repeating unit derived from (meth)acrylic acid, in an amount of more than 90 mol % with respect to the total repeating units in the polymer chain. An inkjet recording method uses the ink composition and a printed matter is printed with the ink composition.

14 Claims, No Drawings

INK COMPOSITION FOR INKJET RECORDING, INKJET RECORDING METHOD, AND PRINTED MATTER

CROSS-REFERENCE TO RELATED APPLICATIONS

This application claims priority under 35 USC 119 from Japanese Patent Application No. 2014-197311, filed Sep. 26, 2014, the disclosure of which is incorporated herein by reference in its entirety.

TECHNICAL FIELD

The present invention relates to an ink composition for inkjet recording, an inkjet recording method, and a printed matter.

BACKGROUND ART

As an image recording method for recording an image on a recording medium such as a paper based on an image data signal, a variety of recording methods such as an electrophotographic method, a thermal transfer method, and an inkjet method are known. In particular, the inkjet method has the advantage that running cost is low and noise is low since an image can be printed by an inexpensive apparatus and the image is directly printed by ejecting an ink to an area where ink deposition is required.

In a recording method utilizing an inkjet method, recording can be performed not only on a paper medium such as a plain paper but on a non-water-absorptive recording medium such as a plastic film or a metal plate. However, since an ink is not absorbed when applied to a non-water-absorptive recording medium, it is difficult to speed up recording and to provide a high quality image, and further, adhesion of the printed image to the recording medium tends to be insufficient.

One example of recording methods utilizing an inkjet method is a recording method using an ink which is curable by irradiation of a radiation. In this method, an ink is ejected and then irradiated with a radiation to cure an ink droplet, whereby a recording speed can be improved and an image having higher sharpness and enhanced adhesion can be formed.

In this method, it is expected that the recording speed and adhesion can be further improved by increasing the sensitivity of the ink for inkjet recording which is curable by irradiation of a radiation such as an ultraviolet ray, and by improving the curability. It is thought that increasing the sensitivity also contributes to improvement of the strength of a printed image.

As a technique related to the above, an inkjet ink composition including a dendritic amide polymer compound having a branched structure, a polymerization initiator, and a radically polymerizable compound is disclosed. It is reported that this inkjet ink composition is excellent in adhesion of an ink image film to a substrate, film strength, and ejection stability (see, for example, Japanese Patent Application Laid-Open (JP-A) No. 2013-082916).

As another technique, an ink composition is disclosed, the ink composition including a polymer including a thiol group and, on a side chain, a partial structure selected from the group consisting of a fluorine-substituted hydrocarbon group, a siloxane skeleton, and a long chain alkyl group, a photopolymerization initiator, and a polymerizable compound (see, for example, JP-A No. 2010-001437). It is thought that, in this ink composition, the polymer including a thiol group and a partial structure having a surface orientation localizes in the surface of the ink composition and increases crosslinking density, and, therefore, the ink composition has a favorable curing sensitivity and has, for example, excellent scratch resistance and excellent antiblocking properties.

SUMMARY OF INVENTION

However, when an image is printed on a non-water-absorptive recording medium such as a plastic film by an inkjet method, although an image having a certain level of film strength is obtained by the above-described conventional technique, there are not only cases in which ink ejection performance during recording is poor but also cases in which adhesion of an image formed by an ink to a recording medium is insufficient.

For example, in an ink composition described in JP-A No. 2013-082916, ink viscosity tends to increase and stability of ejection performance tends to decrease since a polymer compound included as a polymer component has an amide structure as well as a branched structure. In an ink composition described in JP-A No. 2010-001437, the polymer has a high tendency to localize near the surface of the ink composition, and adhesion to a recording medium tends to deteriorate, since the polymer includes, within a molecule thereof, a fluorine-substituted hydrocarbon group, a siloxane skeleton, or a long chain alkyl group.

A further improvement of the film strength of a printed ink image is also desired.

In view of the above, establishment of a technique is desired that enables image recording with a favorable film strength and improved adhesion to a recording medium to be realized without deteriorating ejection performance as an ink for inkjet recording.

The present invention has been made in view of the above. In an embodiment, the present invention addresses provision of an ink composition for inkjet recording and an inkjet recording method which provides high ejection stability during the ejecting and an image having excellent film strength and excellent adhesion to a recording medium, as well as a printed matter provided with an image having excellent film strength and excellent adhesion to a recording medium.

The present invention includes the following aspects.

<1> An ink composition for inkjet recording, including: a (meth)acrylic resin including a skeleton structure derived from a multifunctional thiol that is trifunctional to hexafunctional and plural polymer chains connected to the skeleton structure by a sulfide bond, each of the plural polymer chains including at least two kinds of (meth)acrylic repeating units selected from the group consisting of a repeating unit derived from a (meth)acrylate having a $C_1$-$C_8$ linear, $C_3$-$C_8$ branched, $C_3$-$C_8$ alicyclic, or $C_6$-$C_8$ aromatic hydrocarbon group which may include an oxygen atom, a repeating unit derived from a (meth)acrylate having a $C_9$-$C_{10}$ alicyclic hydrocarbon group, and a repeating unit derived from (meth)acrylic acid, in an amount of more than 90 mol % with respect to a total amount of the repeating units in the polymer chain; a polymerization initiator; and a polymerizable compound.

<2> The ink composition for inkjet recording according to <1>, wherein the multifunctional thiol in the (meth)acrylic resin is a hexafunctional thiol.

<3> The ink composition for inkjet recording according to <1> or <2>, wherein the multifunctional thiol in the (meth)

acrylic resin is at least one selected from the group consisting of dipentaerythritol hexakis(3-mercaptopropionate), dipentaerythritol hexakis(2-mercaptoacetate), and dipentaerythritol hexakis(2-mercaptopropionate).

<4> The ink composition for inkjet recording according to any one of <1> to <3>, wherein at least one of the (meth) acrylic repeating units comprises a repeating unit derived from at least one selected from the group consisting of phenoxyethyl acrylate, 2-(2-ethoxyethoxy)ethyl acrylate, and isobornyl acrylate.

<5> The ink composition for inkjet recording according to any one of <1> to <4>, wherein the weight-average molecular weight of the (meth)acrylic resin is from 1,000 to 30,000.

<6> The ink composition for inkjet recording according to any one of <1> to <5>, wherein the content of the (meth) acrylic resin is from 1% by mass to 15% by mass with respect to the total mass of the ink composition.

<7> The ink composition for inkjet recording according to any one of <1> to <6>, wherein the polymerizable compound comprises at least one monofunctional polymerizable compound.

<8> The ink composition for inkjet recording according to any one of <1> to <7>, wherein the polymerizable compound comprises at least one selected from the group consisting of N-vinylcaprolactam, 2-phenoxyethyl acrylate, cyclic trimethylol propane formal acrylate, isobornyl acrylate, tetrahydrofurfuryl acrylate, 2-(2-ethoxyethoxy)ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, and 4-t-butylcyclohexyl acrylate.

<9> The ink composition for inkjet recording according to any one of <1> to <8>, wherein the polymerizable compound comprises at least one multifunctional polymerizable compound.

<10> The ink composition for inkjet recording according to any one of <1> to <9>, wherein the polymerization initiator comprises at least one selected from the group consisting of an α-aminoketone compound and an acylphosphine oxide compound.

<11> The ink composition for inkjet recording according to any one of <1> to <10>, wherein a content of the repeating unit derived from a (meth)acrylate having a $C_1$-$C_8$ linear, $C_3$-$C_8$ branched, $C_3$-$C_8$ alicyclic, or $C_6$-$C_8$ aromatic hydrocarbon group which may include an oxygen atom in each of the plural polymer chains is 50 mol % or more with respect to the total repeating units in the polymer chain.

<12> The ink composition for inkjet recording according to any one of <1> to <11>, wherein the trifunctional to hexafunctional multifunctional thiol is at least one compound selected from the group consisting of the following formulae (1) to (7):

(1)

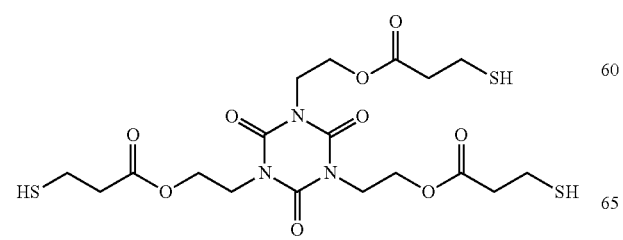

(2)

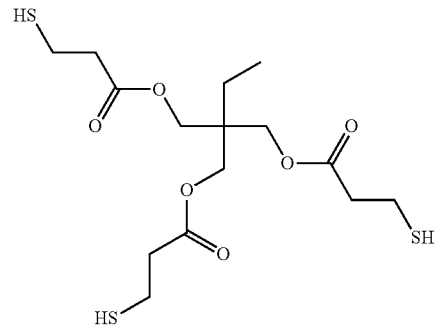

(3)

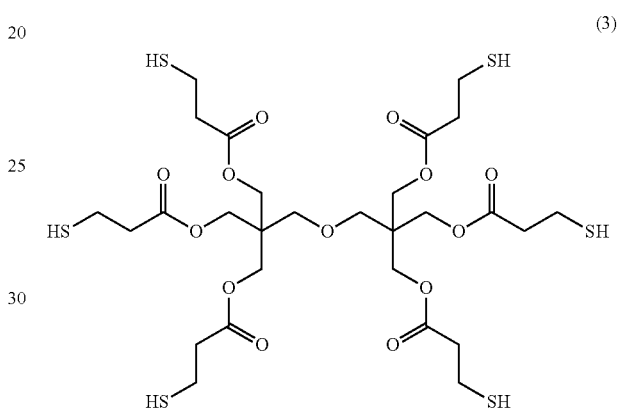

(4)

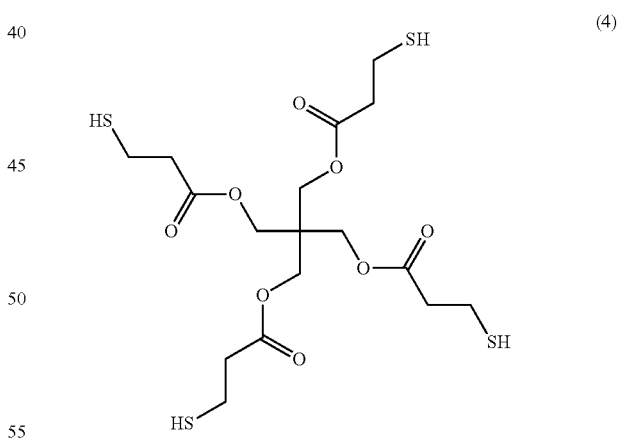

(5)

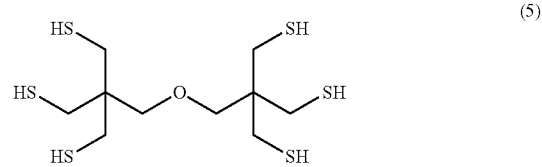

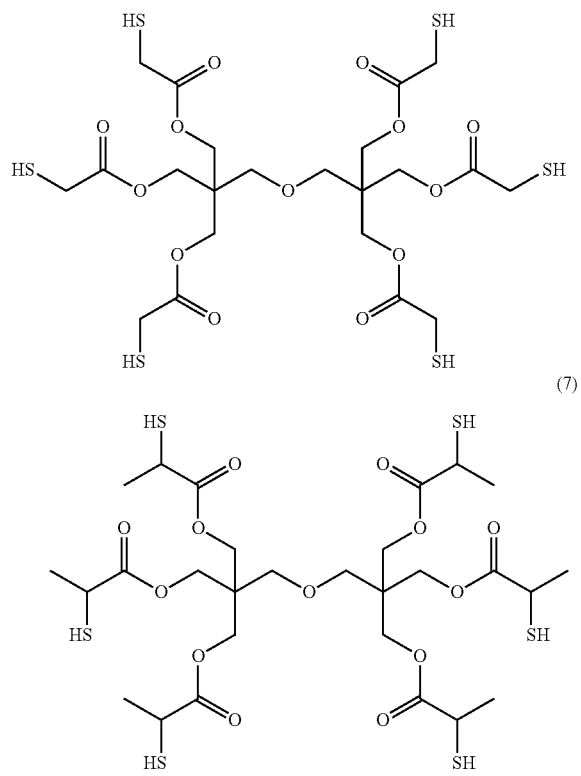

(6)

(7)

the polymerization initiator is at least one compound selected from the group consisting of aromatic ketones and acylphosphine oxide compounds, and the polymerizable compound is an acrylic acid derivative.

<13> An inkjet recording method comprising: a process of ejection the ink composition for inkjet recording according to any one of <1> to <12> onto a recording medium using an inkjet recording apparatus; and a process of irradiating the ejected ink composition with an active energy radiation, thereby curing the ink composition for inkjet recording.

<14> A printed matter that is printed by the inkjet recording method according to <13>.

According to an embodiment of the present invention, an ink composition for inkjet recording and an inkjet recording method are provided which provides high ejection stability during ejecting and an image having excellent film strength and excellent adhesion to a recording medium is provided.

According to an embodiment of the present invention, a printed matter provided with an image having excellent film strength and excellent adhesion to a recording medium is provided.

DESCRIPTION OF EMBODIMENTS

The ink composition for inkjet recording, inkjet recording method, and printed matter according to the present disclosure will be described in detail.

Herein, notation "X to Y" representing a numerical value range means a numerical value range including X and Y as the minimum and maximum values.

The term "(meth)acrylic" is employed to encompass both "acrylic" and "methacrylic", and the term "(meth)acrylate" is employed to encompass both "acrylate" and "methacrylate".

<Ink Composition for Inkjet Recording>

An ink composition for inkjet recording according to the present disclosure (also simply referred to as the "ink composition" hereinafter) includes at least the following ingredients (A) to (C):

(A) a (meth)acrylic resin including:
a skeleton structure derived from a multifunctional thiol that is trifunctional to hexafunctional; and
plural polymer chains connected to the skeleton structure by a sulfide bond, each of the plural polymer chains including at least two kinds of (meth)acrylic repeating units selected from the group consisting of a repeating unit derived from a (meth)acrylate having a $C_1$-$C_8$ linear, $C_3$-$C_8$ branched, $C_3$-$C_8$ alicyclic, or $C_6$-$C_8$ aromatic hydrocarbon group which may include an oxygen atom, a repeating unit derived from a (meth)acrylate having a $C_9$-$C_{10}$ alicyclic hydrocarbon group, and a repeating unit derived from (meth)acrylic acid, in an amount of more than 90 mol % with respect to the total repeating units in the polymer chain;

(B) a polymerization initiator; and (C) a polymerizable compound.

The ink composition for inkjet recording according to the present disclosure may further include, in addition to the ingredients (A) to (C), a colorant (D), and other additives (E) such as a polymerization inhibitor, as needed.

The ink composition according to the present disclosure exerts effects with respect to attainment of excellent ejection stability and formation of an image having excellent film strength and excellent adhesion to a recording medium, due to the inclusion of the ingredients (A) to (C).

Although the mechanism by which the ink composition according to the present disclosure exerts such effects is not perfectly clear, we presume that the following mechanism works.

In the present disclosure, curability is imparted by including a polymerizable compound and a polymerization initiator, and, in addition, the inclusion of a (meth)acrylic resin having the specific structure as a polymer component enables an image having an excellent film strength to have increased adhesion to a recording medium while the viscosity of the ink composition is maintained low. Specifically, the (meth)acrylic resin includes plural polymer chains as well as a branched skeleton structure having 3 to 6 branches derived from a multifunctional thiol, which enables the ink viscosity to be maintained low. Also, it is conceivable that, since each of the polymer chains of the (meth)acrylic resin includes, as main units, at least two kinds of (meth)acrylic repeating units that do not include a long chain hydrocarbon group having more than 10 carbon atoms, the (meth)acrylic resin tends to be distributed in the ink composition without localization, and, as a consequence, adhesion of the ink composition to a recording medium is improved.

In the present disclosure, each repeating unit in the at least two kinds of (meth)acrylic repeating units selected from the group consisting of a repeating unit derived from a (meth)acrylate having a $C_1$-$C_8$ linear, $C_3$-$C_8$ branched, $C_3$-$C_8$ alicyclic, or $C_6$-$C_8$ aromatic hydrocarbon group which may include an oxygen atom, a repeating unit derived from a (meth)acrylate having $C_9$-$C_{10}$ alicyclic hydrocarbon group, and a repeating unit derived from (meth)acrylic acid may be selected independently. For example, the at least two kinds of (meth)acrylic repeating units may be two kinds of repeating units each derived from a (meth)acrylate having a $C_6$-$C_8$ aromatic hydrocarbon group which may include an oxygen atom.

From the viewpoint of further suppressing an increase in the viscosity of the ink composition or alleviating insufficiency in the adhesion of an image to a recording medium, the (meth)acrylic resin in the present disclosure preferably has a structure in which the polymer chains do not include an atom (such as a fluorine atom (F), silicon atom (Si), or nitrogen atom (N)) other than a carbon atom (C), hydrogen atom (H), and oxygen atom (O) (in other words, each (meth)acrylic repeating unit in the polymer chain is formed of C, H, and O). In particular, when the polymer chains of the (meth)acrylic resin do not include a fluorine atom (F) or a silicon atom (Si), the (meth)acrylic resin has a lower tendency to localize in the surface of the ink composition, whereby the localization of the (meth)acrylic resin in the ink composition can more easily be prevented. When the polymer chains of the (meth)acrylic resin do not include a nitrogen atom (N), such as a nitrogen atom in an amide, an increase in the viscosity of the ink composition can more effectively be suppressed.

Descriptions of the ingredients included in the ink composition according to the present disclosure are provided below.

(A) (Meth)Acrylic Resin

The ink composition for inkjet recording according to the present disclosure includes at least one (meth)acrylic resin including a skeleton structure derived from a multifunctional thiol that is trifunctional to hexafunctional and plural polymer chains connected to the skeleton structure by a sulfide bond, each of the plural polymer chains including at least two kinds of (meth)acrylic repeating units selected from the group consisting of a repeating unit derived from a (meth)acrylate having a $C_1$-$C_8$ linear, $C_3$-$C_8$ branched, $C_3$-$C_8$ alicyclic, or $C_6$-$C_8$ aromatic hydrocarbon group which may include an oxygen atom, a repeating unit derived from a (meth)acrylate having a $C_9$-$C_{10}$ alicyclic hydrocarbon group, and a repeating unit derived from (meth)acrylic acid, in an amount of more than 90 mol % with respect to the total repeating units in the polymer chain (this (meth)acrylic resin will be hereinafter also referred to as the "specific resin according to the present disclosure").

The specific resin according to the present disclosure has a branched structure including three branches to six branches which is derived from a multifunctional thiol. Since the specific resin according to the present disclosure has a branched skeleton structure, an increase in the viscosity of the ink composition can be suppressed even though the specific resin is a high molecular weight compound to which plural polymer chains are connected, and the ejection performance in the case of ejecting by an inkjet method can be stably maintained.

When the multifunctional thiol has fewer than three thiol groups, an effect with respect to decreasing viscosity due to branching is small, as a result of which favorable ejection stability cannot be maintained, and the film strength of the image and adhesion thereof to a recording medium also deteriorate. When the multifunctional thiol has more than six thiol groups, it is difficult to obtain such a multifunctional thiol, and the ejection stability tends to be deteriorated in the case of a use as an ink composition for inkjet recording.

In the present disclosure, the multifunctional thiol is preferably hexafunctional, considering that hexafunctional thiols have a high effect with respect to a decrease in viscosity due to branching, and enables ejection stability to be more favorably maintained.

The branched structure described above decreases the viscosity through formation of a network due to mutual engangling of the specific polymer chains bonded to the branched structure via a sulfide bond (—S-bond). Therefore, the film strength of the image is improved.

It is preferable that the specific polymer chain is bonded to at least two branch ends of the branched structure, and it is more preferable that the specific polymer chain is bonded to all of the branch ends of the branched structure.

Examples of the multifunctional thiol include the following compounds.

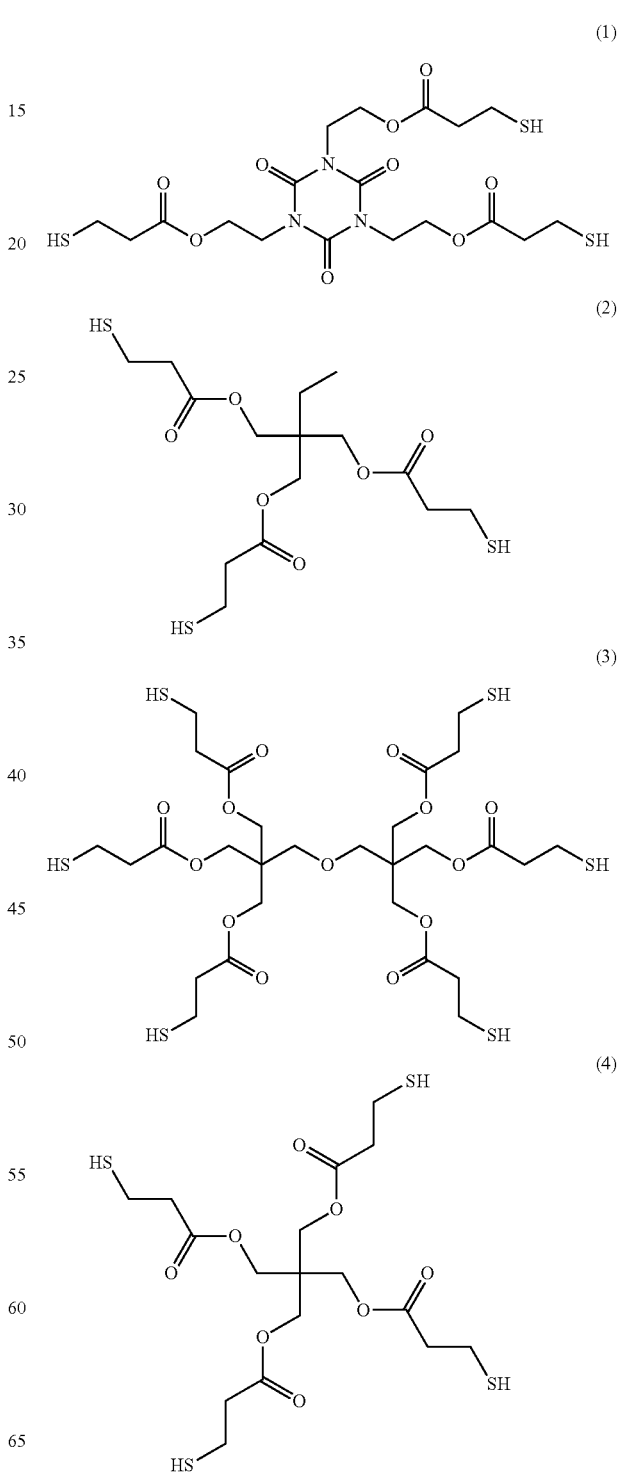

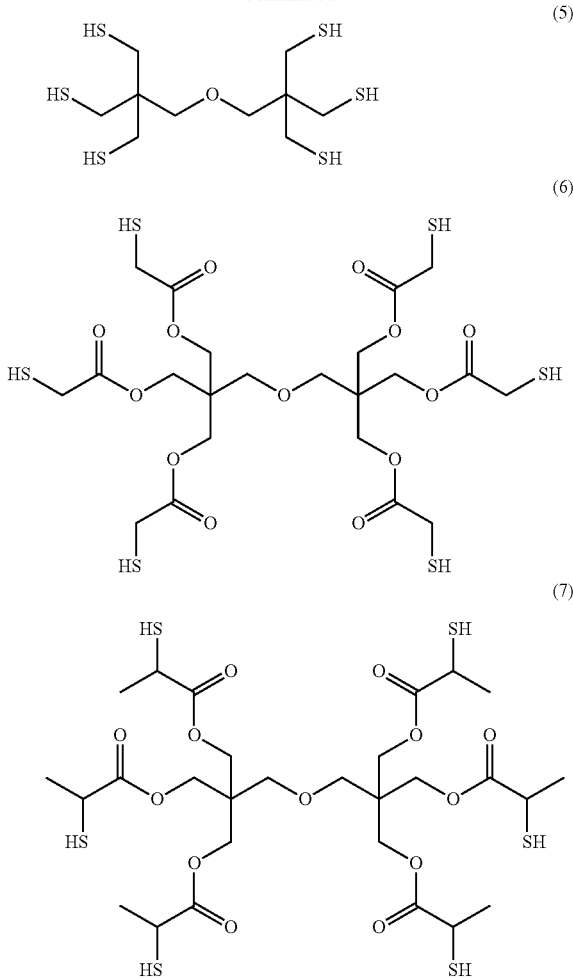

(5)

(6)

(7)

Among the above compounds, a multifunctional thiol selected from the above compound (3) [dipentaerythritol hexakis(3-mercaptopropionate)], compound (6) [dipentaerythritol hexakis(2-mercaptoacetate)], and compound (7) [dipentaerythritol hexakis(2-mercapto propionate)] is preferable from the viewpoint of suppressing an increase in the viscosity of the ink composition and further improving the ejection stability.

Each of the polymer chains includes at least two kinds of (meth)acrylic repeating units selected from the group consisting of (a) a repeating unit derived from a (meth)acrylate having a $C_{1-8}$ linear, $C_{3-8}$ branched, $C_{3-8}$ alicyclic, or $C_{6}$-$C_{8}$ aromatic hydrocarbon group which may include an oxygen atom (also referred to as the "repeating unit (a)" hereinafter), (b) a repeating unit derived from a (meth)acrylate having a $C_{9-10}$ alicyclic hydrocarbon group (also referred to as the "repeating unit (b)" hereinafter), and (c) a repeating unit derived from (meth)acrylic acid (also referred to as the "repeating unit (c)", hereniafter).

—Repeating Unit (a)—

Among (meth)acrylic repeating units, the repeating unit (a) is a repeating unit formed by copolymerization reaction of a (meth)acrylate having a hydrocarbon group which may include an oxygen atom, and the hydrocarbon group may be linear, branched, alicyclic, or aromatic.

The meth(acrylate) for forming the repeating unit (a) may be an ester compound in which the hydrocarbon group in the (meth)acrylate is formed only of one or more carbon atoms (C) and one or more hydrogen atoms (H), or an ester compound in which the hydrocarbon group in the meth (acrylate) also includes one or more oxygen atoms (O) as well as one or more carbon atoms and one or more hydrogen atoms.

When the hydrocarbon group includes an oxygen atom, the term "hydrocarbon group including an oxygen atom" refers to a group obtainable by bonding a hydrocarbon group to another hydrocarbon group via an oxygen atom.

Examples of a $C_1$-$C_8$ linear, $C_3$-$C_8$ branched, $C_3$-$C_8$ alicyclic, or $C_6$-$C_8$ aromatic hydrocarbon group which may include an oxygen atom include a methyl group, an ethyl group, a propyl group, a t-butyl group, a benzyl group, a methoxyethyl group, an ethoxyethyl group, a phenoxyethyl group, an ethoxyethoxy ethyl group, an ethenyloxy ethoxy ethyl group, a cyclohexyl group, a norbornyl group, an n-octyl group, and a 2-ethylhexyl group.

Among the above, an ethoxyethoxy ethyl group and a phenoxyethyl group are preferable.

That the number of carbon atoms of the hydrocarbon group of the (meth)acrylate for forming the repeating unit (a) is 8 or less means that the scope of the hydrocarbon group does not include large hydrocarbon groups such as long chain alkyl groups. When the number of carbon atoms of the hydrocarbon group is larger than 8, adhesion of an image to a recording medium considerably deteriorates, and the film strength of the image also deteriorates.

Although a preferable range of the number of carbon atoms of the hydrocarbon group in the repeating unit (a) depends on the number of carbon atoms of the hydrocarbon group of another (meth)acrylate for forming a (meth)acrylic repeating unit other than the repeating unit (a), the number of carbon atoms of the hydrocarbon group in the repeating unit (a) is preferably from 6 to 8 from the same viewpoint as described above.

Specific examples of the repeating unit derived from the (meth)acrylate having a $C_1$-$C_8$ linear, $C_3$-$C_8$ branched, $C_3$-$C_8$ alicyclic, or $C_6$-$C_8$ aromatic hydrocarbon group which may include an oxygen atom include repeating units illustrated as repeating unit 1 or repeating unit 2 in Tables 1 to 6 below, and the repeating units illustrated below.

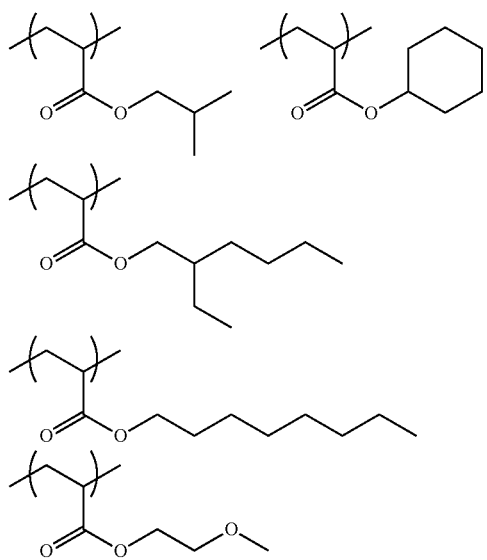

Among (meth)acrylates having a $C_1$-$C_8$ linear, $C_3$-$C_8$ branched, $C_3$-$C_8$ alicyclic, or $C_6$-$C_8$ aromatic hydrocarbon group which may include an oxygen atom, 2-phenoxyethyl acrylate and 2-(2-ethoxyethoxy)ethyl acrylate are preferable from the viewpoint that ejection stability is favorably maintained and adhesion of an image to a recording medium and film strength improve.

—Repeating Unit (b)—

Among the (meth)acrylic repeating units, the repeating unit (b) is a repeating unit formed by a copolymerization reaction of a (meth)acrylate having a $C_9$-$C_{10}$ alicyclic hydrocarbon group, and is preferably formed of one or more carbon atoms (C) and one or more hydrogen atoms (H).

Examples of the $C_9$-$C_{10}$ alicyclic hydrocarbon group include: a monocyclic hydrocarbon group such as a trimethylcyclohexyl group or a t-butyl cyclohexyl group; and a polycyclic hydrocarbon group such as an isobornyl group, an adamantyl group, a dicyclopentanyl group, a dicyclopentenyl group, a tricyclo[5.2.1.0$^{2,6}$]decanyl group, or a bicyclo[4.3.0]nonyl group. The alicyclic hydrocarbon group may further include a substituent, and examples of the substituent include an alkyl group, an alkenyl group, an aryl group, an aralkyl group, an alkoxy group, a hydroxy group, an amino group, an alkyl carbonyl group, an aryl carbonyl group, and a cyano group. The alicyclic hydrocarbon group may further form a condensed ring.

Among (meth)acrylates having a $C_9$-$C_{10}$ alicyclic hydrocarbon group, isobornyl acrylate, trimethylcyclohexyl acrylate, and t-butylcyclohexyl acrylate are preferable from the viewpoint that ejection stability is favorably maintained and adhesion of an image to a recording medium and film strength improve.

When the number of carbon atoms of the hydrocarbon group of the (meth)acrylate for forming the repeating unit (b) is from 9 to 10, ejection stability is favorably maintained and film strength improves. In particular, when the number of carbon atoms of the hydrocarbon group is larger than 10, deterioration of ejection stability occurs due to an increase in the viscosity, and adhesion of an image to a recording medium considerably deteriorates, and the film strength of the image also deteriorates.

Specific examples of the repeating unit derived from the (meth)acrylate having a $C_9$-$C_{10}$ alicyclic hydrocarbon group include the compounds represented by Repeating unit 1 or Repeating unit 2 illustrated in Tables 1 to 6 below.

—Repeating Unit (c)—

Among the (meth)acrylic repeating units, the repeating unit (c) is a repeating unit formed by copolymerization reaction of acrylic acid or methacrylic acid, and is preferably a repeating unit derived from methacrylic acid.

The polymer chain in the specific resin according to the present disclosure includes at least two kinds of (meth)acrylic repeating units.

When only one type of (meth)acrylic repeating unit is included in the polymer chain, the viscosity cannot be stably maintained, deterioration of ejection stability of the ink composition occurs due to an increase in the viscosity, and adhesion of an image to a recording medium and film strength are also tend to deteriorate, regardless of whether or not the above-described skeleton structure derived from a multifunctional thiol is present.

The polymer chain is preferably formed of two types of (meth)acrylic repeating units.

From the viewpoint of inhibiting an increase in the viscosity of the ink composition and attaining ejection stability and adhesion of an image and film strength, the polymer chain preferably includes a repeating unit or repeating units derived from at least one of 2-phenoxyethyl acrylate, 2-(2-ethoxyethoxy)ethyl acrylate, or isobornyl acrylate as a (meth)acrylic repeating unit. Further, the polymer chain preferably includes a repeating unit or repeating units derived from at least one of 2-phenoxyethyl acrylate, 2-(2-ethoxyethoxy)ethyl acrylate, or isobornyl acrylate as one or two of the two types of (meth)acrylic repeating units.

The ratio of the at least two kinds of (meth)acrylic repeating units selected from the repeating units (a) to (c) in the polymer chain is set to be in a range of more than 90 mol % with respect to the total repeating units in the polymer chain. The above-described repeating units (a) to (c) are repeating units derived from a (meth)acrylate or (meth) acrylic acid which do not include a long chain hydrocarbon group having more than ten carbon atoms. When such repeating units (a) to (c) are included as main ingredients in an amount of more than 90 mol % of the total repeating units, the viscosity of the ink composition can be stably maintained in a range appropriate for ejection. As a result, the ink composition has excellent ejection stability during recording.

In particular, in view of the above, the ratio of the at least two kinds of (meth)acrylic repeating units selected from the repeating units (a) to (c) is preferably 95 mol % or more with respect to the total repeating units in the polymer chain.

The content ratio of the repeating unit (a) among the (meth)acrylic repeating units selected from the repeating units (a) to (c) in each polymer chain is preferably 50 mol % or more, more preferably 60 mol % or more, and still preferably 80 mol % or more, with respect to the total repeating units in the polymer chain. When the content ratio of the repeating unit (a) in the polymer chain is within the above-described range, the effect according to the present disclosure is more stably exerted.

A (meth)acrylic resin that includes two types of (meth)acrylic repeating units that are a (meth)acrylic repeating unit within the scope of the repeating unit (a) and another (meth)acrylic repeating unit within the scope of the repeating unit (a) having a structure different from that of the former repeating unit—i.e., a (meth)acrylic resin having a polymer chain including two types of repeating units (a) at a total content of 100% by mol is also a preferred example of the meth(acrylic) resin (A).

Each of the at least two kinds of (meth)acrylic repeating units in the polymer chain is preferably a (meth)acrylic repeating unit that does not include an atom (such as a fluorine atom (F), a silicon atom (Si), or a nitrogen atom (N)) other than a carbon atom (C), a hydrogen atom (H), and an oxygen atom (O), and is more preferably a (meth)acrylic repeating unit in which the polymer chain is formed only of C, H, and O.

In the following, exemplary compounds (polymer P-1 to P-27) of the (meth)acrylic resin are shown. However, the (meth)acrylic resin according to the present disclosure is not limited to these exemplary compounds.

TABLE 1
| (Meth)acrylic resin |
|---|
P-1
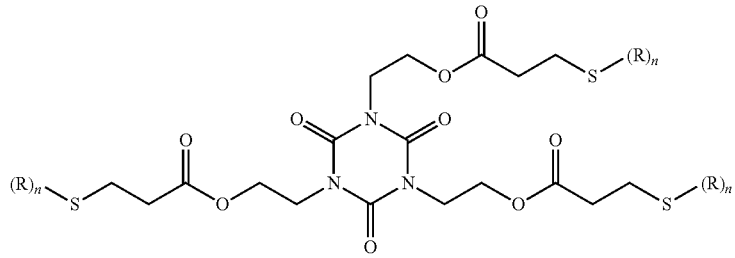
Multifunctional thiol = Trifunctional
P-2
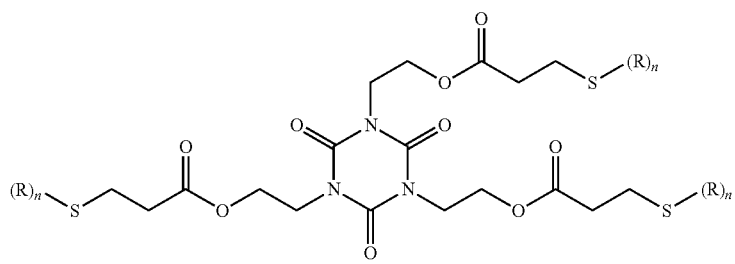
Multifunctional thiol = Trifunctional
P-3
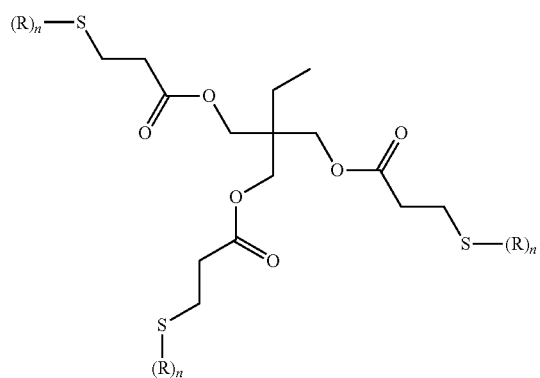
Multifunctional thiol = Trifunctional
P-4
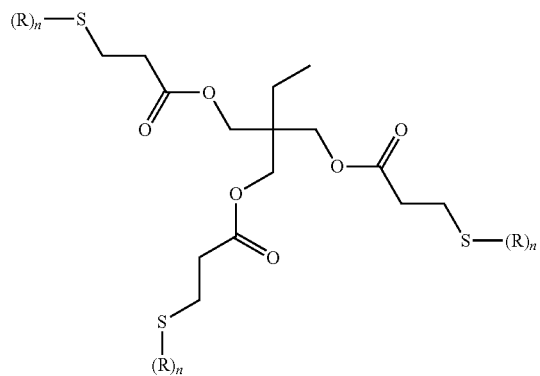
Multifunctional thiol = Trifunctional TABLE 1-continued
P-5
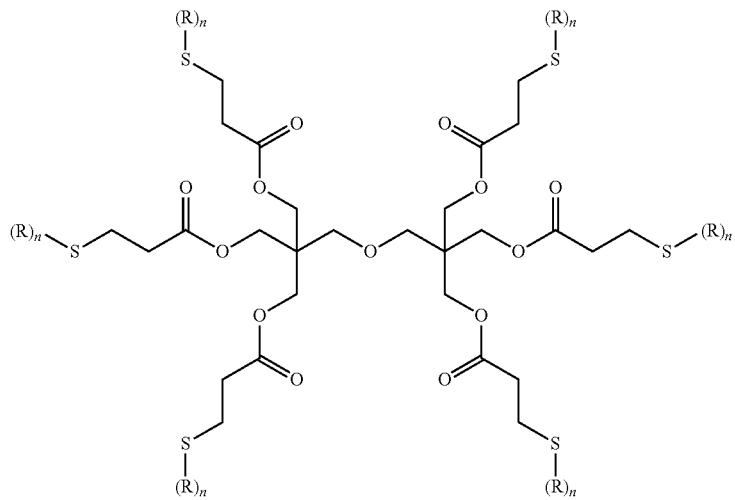
Multifunctional thiol = Hexafunctional dipentaerythritol hexakis(3-mercapto-propionate)
P-6
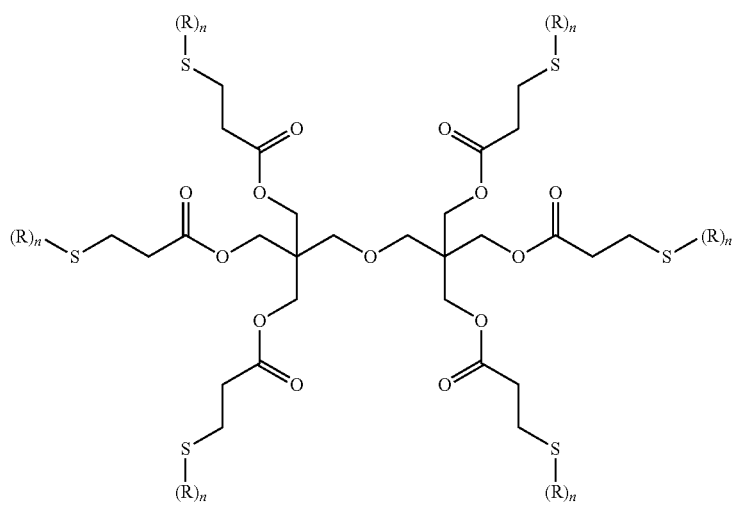
Multifunctional thiol = Hexafunctional dipentaerythritol hexakis(3-mercapto-propionate)

TABLE 1-continued

| | Repeating unit of polymer chain (illustrated as (R) in the left column) | |
|---|---|---|
| | Repeating unit derived from (meth)acrylate having C$_1$—C$_8$ linear, C$_3$—C$_8$ branched, C$_3$—C$_8$ cyclic or C$_6$—C$_8$ aromatic hydrocarbon group, or (meth)acrylic acid | Repeating unit derived from (meth)acrylate having C$_9$—C$_{10}$ alicyclic hydrocarbon group |
| P-1 | Repeating unit 1<br>carbon number: 1 | Repeating unit 2<br>carbon number: 10 |
| P-2 | Repeating unit 1<br>carbon number: 1 | Repeating unit 2<br>carbon number: 9 |
| P-3 | Repeating unit 1<br>carbon number: 4 | Repeating unit 2<br>carbon number: 10 |
| P-4 | Repeating unit 1<br>carbon number: 6 | Repeating unit 2<br>carbon number: 10 |
| P-5 | Repeating unit 1 | Repeating unit 2<br>carbon number: 10 |

TABLE 1-continued
| P-6 | Repeating unit 1 | — | Repeating unit 2 carbon number : 10 |
|---|---|---|---|
| | 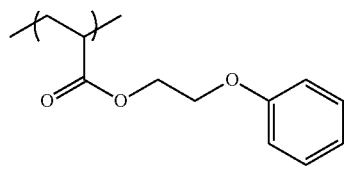 | | 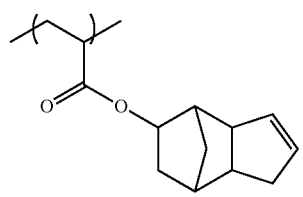 |

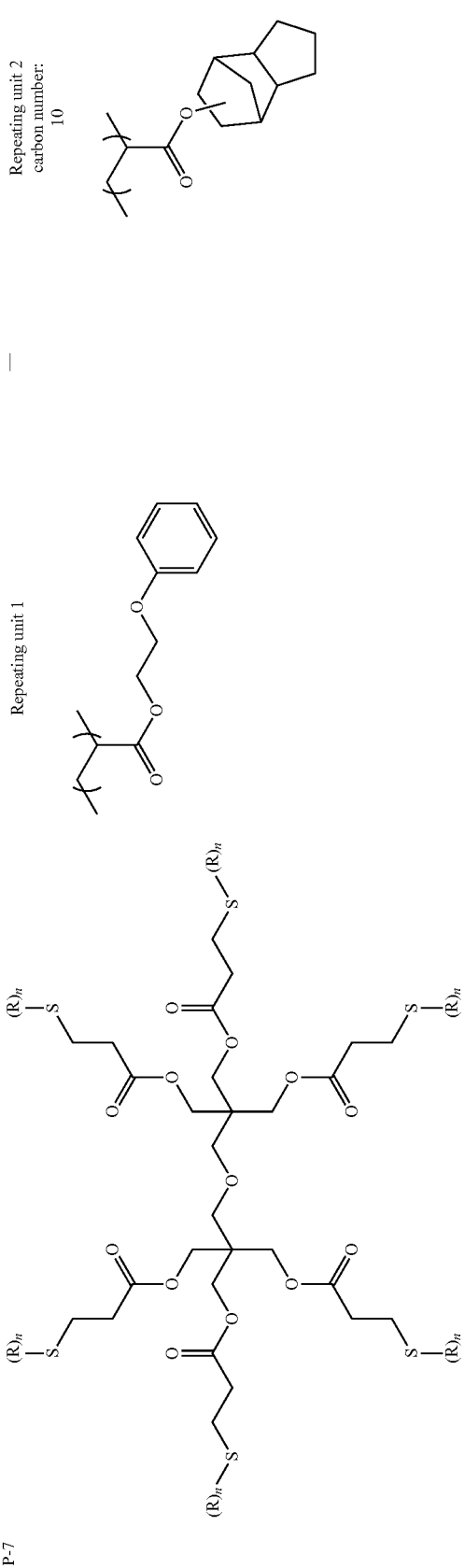

TABLE 2-continued

| (Meth)acrylic resin | Repeating unit of polymer chain (illustrated as (R) in the left column) | | |
|---|---|---|---|
| | Repeating unit derived from (meth)acrylate having C$_1$—C$_8$ linear, C$_3$—C$_8$ branched, C$_3$—C$_8$ cyclic or C$_6$—C$_8$ aromatic hydrocarbon group, or (meth)acrylic acid | Repeating unit derived from (meth)acrylate having C$_9$—C$_{10}$ alicyclic hydrocarbon group | |
| P-8 Multifunctional thiol = Hexafunctional dipentaerythritol hexakis(3-mercapto-propionate) | Repeating unit 1 | Repeating unit 2 carbon number: 10 | |

TABLE 2-continued

| (Meth)acrylic resin | Repeating unit of polymer chain (illustrated as (R) in the left column) | |
| --- | --- | --- |
| | Repeating unit derived from (meth)acrylate having $C_1$—$C_8$ linear, $C_3$—$C_8$ branched, $C_3$—$C_8$ cyclic or $C_6$—$C_8$ aromatic hydrocarbon group, or (meth)acrylic acid | Repeating unit derived from (meth)acrylate having $C_9$—$C_{10}$ alicyclic hydrocarbon group |
| P-9 Multifunctional thiol = Hexafunctional dipentaerythritol hexakis(3-mercapto-propionate) | Repeating unit 1 | Repeating unit 2 carbon number: 10 |

TABLE 2-continued

| (Meth)acrylic resin | Repeating unit of polymer chain (illustrated as (R) in the left column) | | Repeating unit derived from (meth)acrylate having C₉—C₁₀ alicyclic hydrocarbon group |
|---|---|---|---|
| | Repeating unit derived from (meth)acrylate having C₁—C₈ linear, C₃—C₈ branched, C₃—C₈ cyclic or C₆—C₈ aromatic hydrocarbon group, or (meth)acrylic acid | | |
| | Repeating unit 1 | Repeating unit 2 | |
| P-10 — Multifunctional thiol = Tetrafunctional | methyl methacrylate structure | methacrylic acid structure | — |
| P-11 — Multifunctional thiol = Hexafunctional | methyl methacrylate structure | cyclohexyl methacrylate structure | — |

TABLE 3
(Meth)acrylic resin
P-12
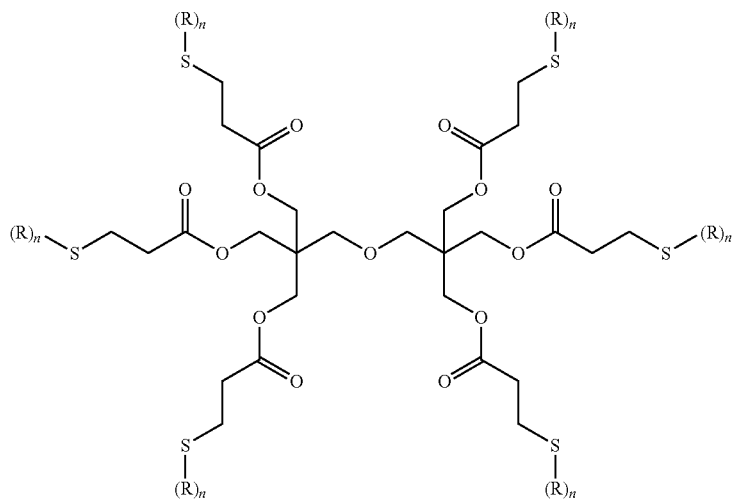
Multifunctional thiol = Hexafunctional dipentaerythritol hexakis(3-mercapto-propionate)
P-13
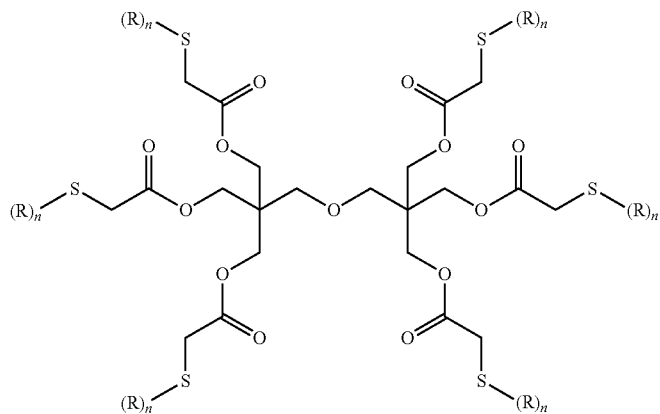
Multifunctional thiol = Hexafunctional dipentaerythritol hexakis(2-mercapto-acetate)

TABLE 3-continued
P-14
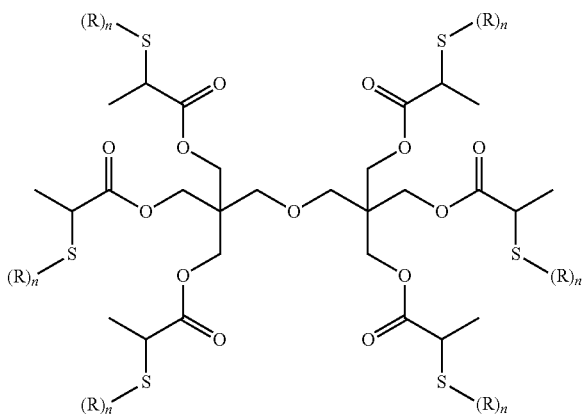
Multifunctional thiol = Hexafunctional
dipentaerythritol hexakis(2-mercapto-
propionate)
P-15
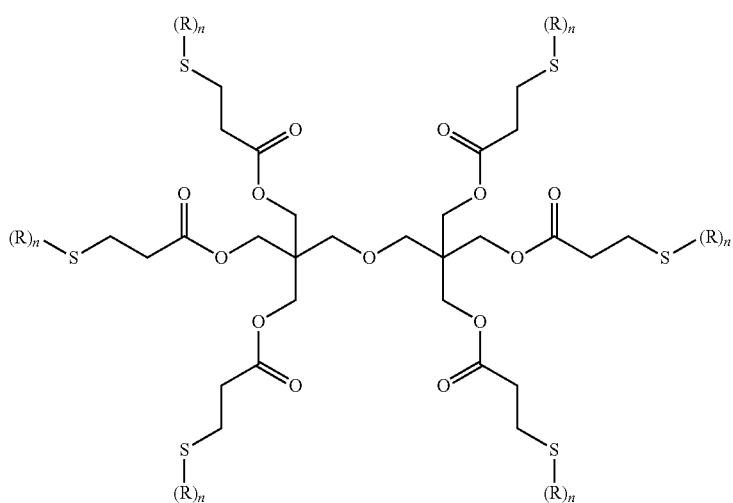
Multifunctional thiol = Hexafunctional
dipentaerythritol hexakis(3-mercapto-
propionate)

TABLE 3-continued

P-16

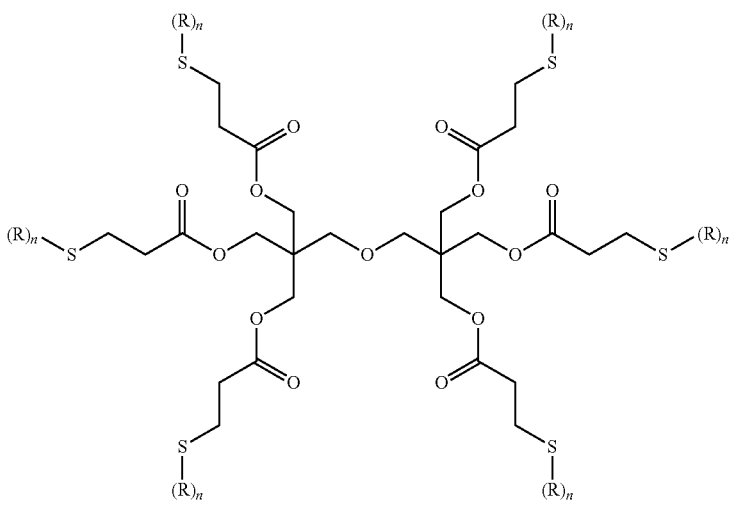

Multifunctional thiol = Hexafunctional dipentaerythritol hexakis(3-mercapto-propionate)

| | Repeating unit of polymer chain (illustrated as (R) in the left column) | | |
|---|---|---|---|
| | Repeating unit derived from (meth)acrylate having $C_1$—$C_8$ linear, $C_3$—$C_8$ branched, $C_3$—$C_8$ cyclic or $C_6$—$C_8$ aromatic hydrocarbon group, or (meth)acrylic acid | | Repeating unit derived from (meth)acrylate having $C_9$—$C_{10}$ alicyclic hydrocarbon group |
| P-12 | Repeating unit 1 | Repeating unit 2 | — |
| P-13 | Repeating unit 1 | Repeating unit 2 | — |
| P-14 | Repeating unit 1 | Repeating unit 2 | — |
| P-15 | Repeating unit 1 | Repeating unit 2 | — |

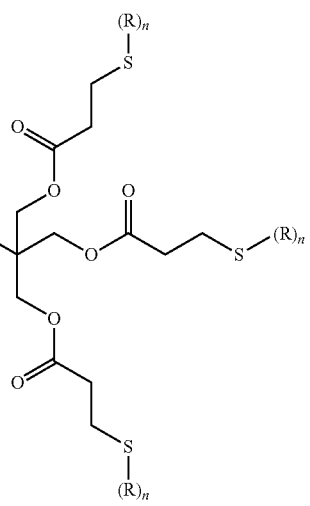

TABLE 3-continued
| P-16 | Repeating unit 1 | Repeating unit 2 | — |
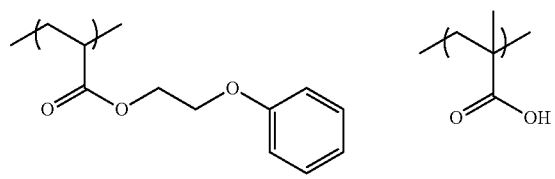
TABLE 4
| (Meth)acrylic resin |
P-17
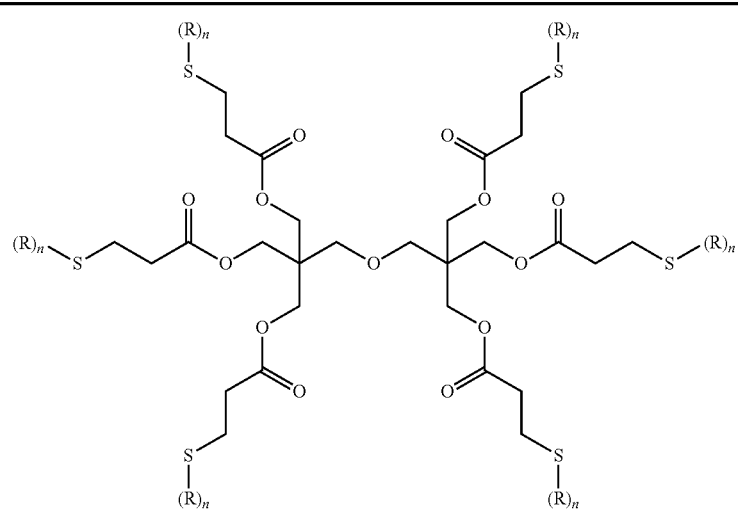
Multifunctional thiol = Hexafunctional dipentaerythritol hexakis(3-mercapto-propionate)
P-18
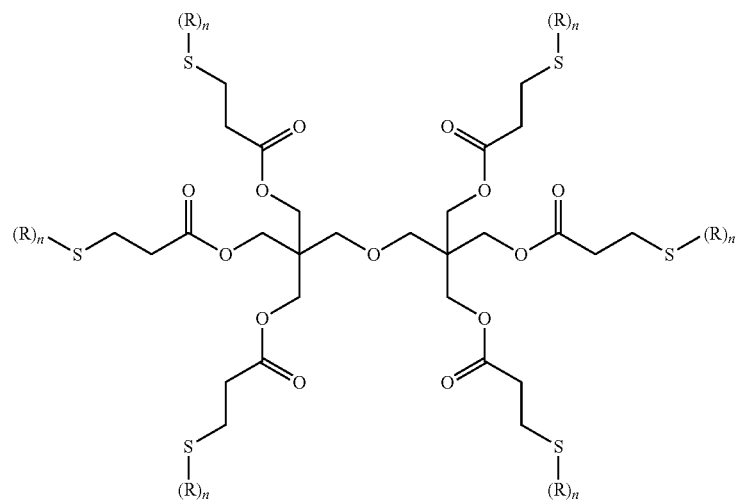
Multifunctional thiol = hexafunctional dipentaerythritol hexakis(3-mercapto-propionate)

TABLE 4-continued
P-19
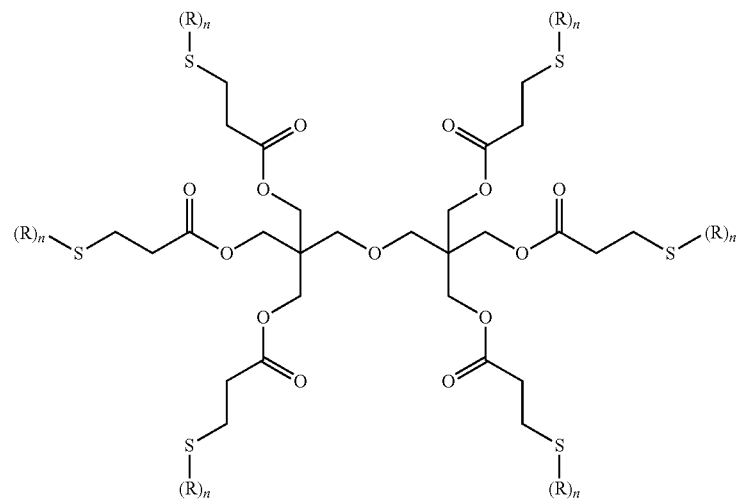
Multifunctional thiol = hexafunctional
dipentaerythritol hexakis(3-mercapto-
propionate)
P-20
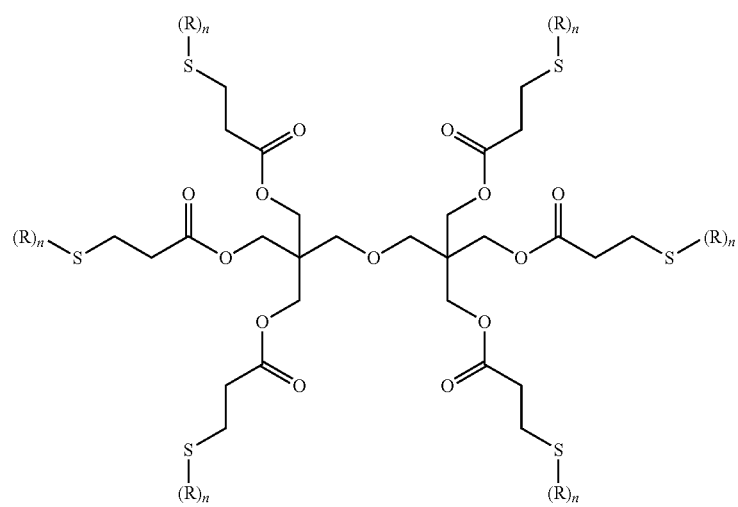
Multifunctional thiol = Hexafunctional
dipentaerythritol hexakis(3-mercapto-
propionate)

TABLE 4-continued

| | Repeating unit of polymer chain (illustrated as (R) in the left column) | | Repeating unit derived from (meth)acrylate having $C_9$–$C_{10}$ alicyclic hydrocarbon group |
|---|---|---|---|
| | Repeating unit derived from (meth)acrylate having $C_1$–$C_8$ linear, $C_3$–$C_8$ branched, $C_3$–$C_8$ cyclic or $C_6$–$C_8$ aromatic hydrocarbon group, or (meth)acrylic acid | | |
| P-17 | Repeating unit 1 | Repeating unit 2 | — |
| P-18 | Repeating unit 1 | Repeating unit 2 | — |
| P-19 | Repeating unit 1 | Repeating unit 2 | — |
| P-20 | Repeating unit 1 | Repeating unit 2 | — |

TABLE 5

| (Meth)acrylic resin | Repeating unit of polymer chain (illustrated as (R) in the left column) | |
|---|---|---|
| | Repeating unit derived from (meth)acrylate having $C_1$—$C_8$ linear, $C_3$—$C_8$ branched, $C_3$—$C_8$ cyclic or $C_6$—$C_8$ aromatic hydrocarbon group, or (meth)acrylic acid | Repeating unit derived from (meth)acrylate including $C_9$—$C_{10}$ alicyclic hydrocarbon group |
| P-21 Multifunctional thiol = Hexafunctional dipentaerythritol hexakis(3-mercapto-propionate) 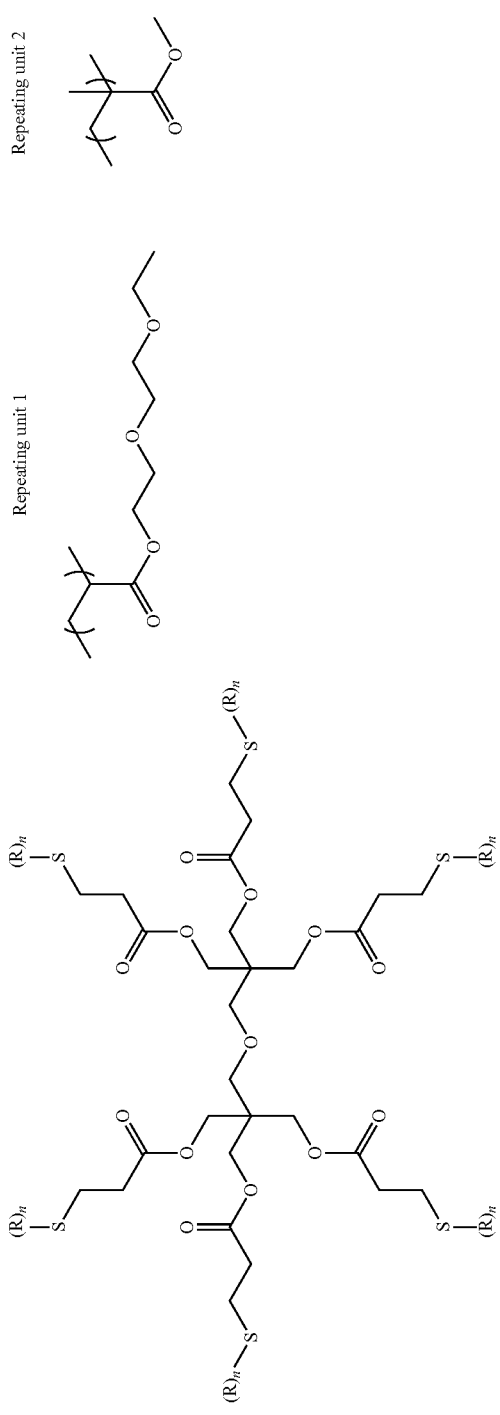 | Repeating unit 1 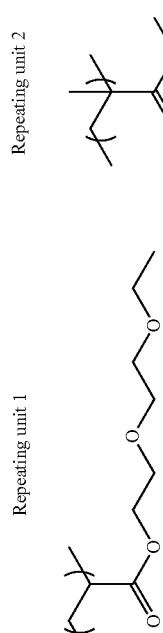 Repeating unit 2 | — |

TABLE 5-continued

| (Meth)acrylic resin | Repeating unit of polymer chain (illustrated as (R) in the left column) | |
|---|---|---|
| | Repeating unit derived from (meth)acrylate having $C_1$–$C_8$ linear, $C_3$–$C_8$ branched, $C_3$–$C_8$ cyclic or $C_6$–$C_8$ aromatic hydrocarbon group, or (meth)acrylic acid | Repeating unit derived from (meth)acrylate including $C_9$–$C_{10}$ alicyclic hydrocarbon group |
| P-22 | Repeating unit 1 / Repeating unit 2 | — |

Multifunctional thiol = Hexafunctional dipentaerythritol hexakis(3-mercapto-propionate)

TABLE 5-continued

| | (Meth)acrylic resin | Repeating unit of polymer chain (illustrated as (R) in the left column) | |
|---|---|---|---|
| | | Repeating unit derived from (meth)acrylate having $C_1$–$C_8$ linear, $C_3$–$C_8$ branched, $C_3$–$C_8$ cyclic or $C_6$–$C_8$ aromatic hydrocarbon group, or (meth)acrylic acid | Repeating unit derived from (meth)acrylate including $C_9$–$C_{10}$ alicyclic hydrocarbon group |
| P-23 | 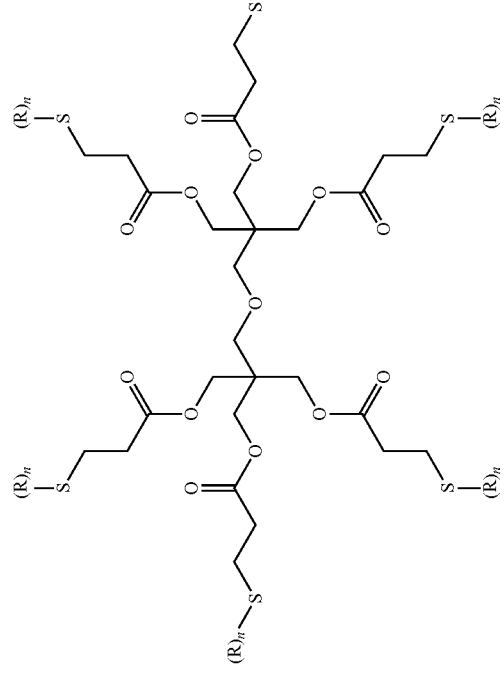 Multifunctional thiol = Hexafunctional dipentaerythritol hexakis(3-mercapto-propionate) | Repeating unit 1 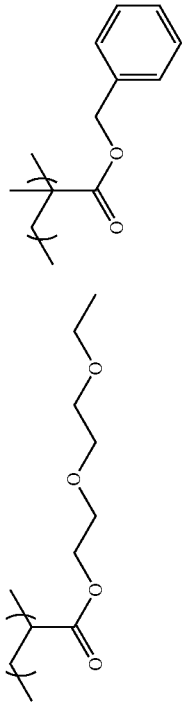 Repeating unit 2 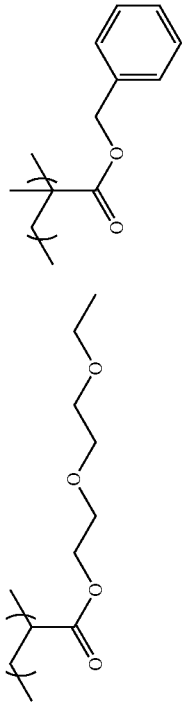 | — |

TABLE 6
| (Meth)acrylic resin |
| --- |
P-24
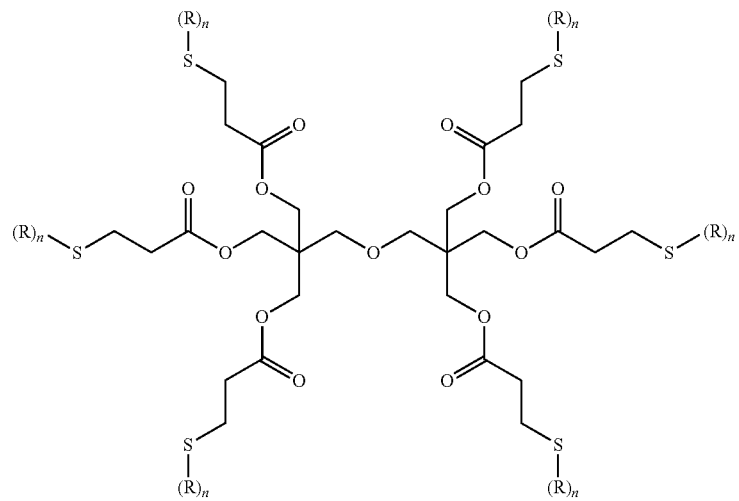
Multifunctional thiol = Hexafunctional dipentaerythritol hexakis(3-mercapto-propionate)
P-25
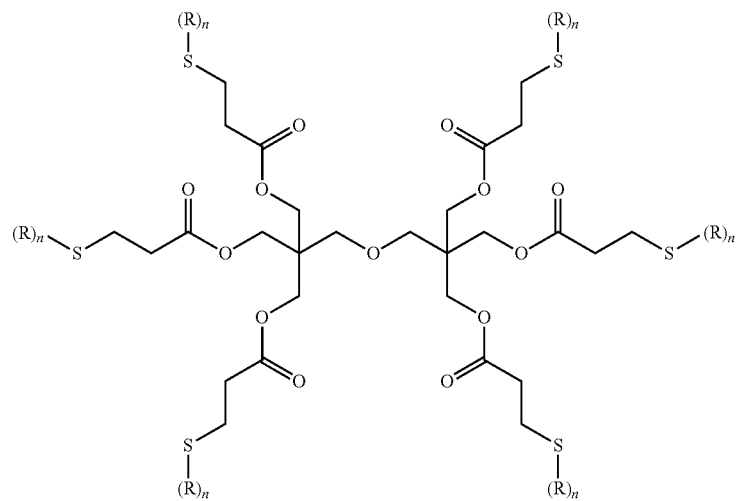
Multifunctional thiol = Hexafunctional dipentaerythritol hexakis(3-mercapto-propionate)

TABLE 6-continued
P-26
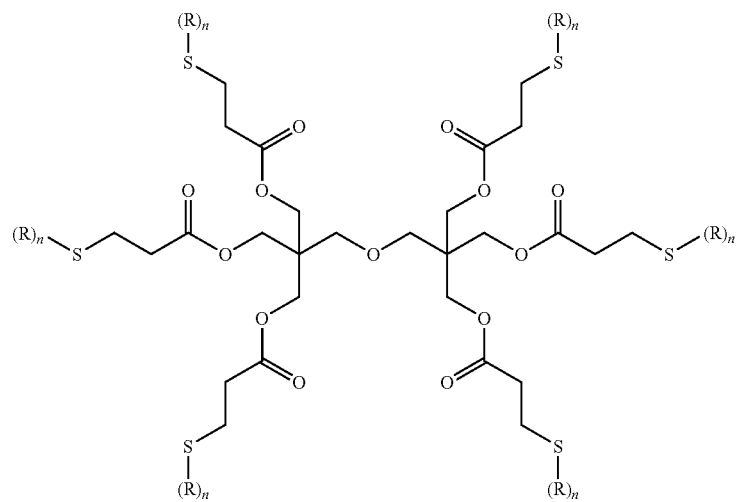
Multifunctional thiol = Hexafunctional dipentaerythritol hexakis(3-mercapto-propionate)
P-27
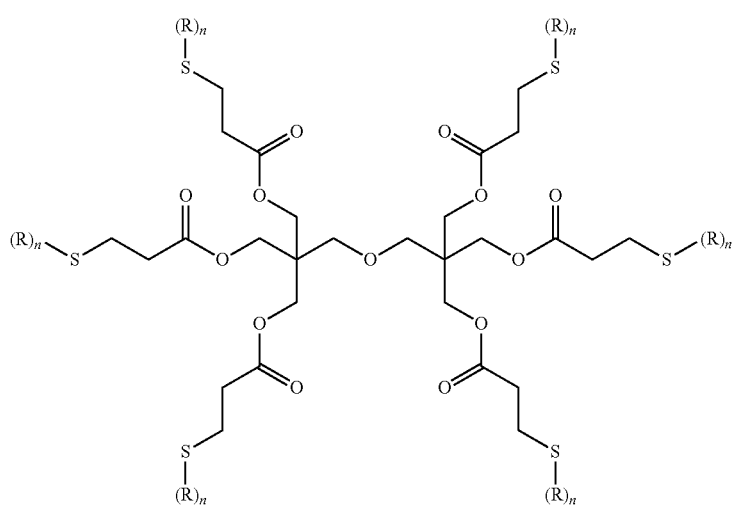
Multifunctional thiol = Hexafunctional dipentaerythritol hexakis(3-mercapto-propionate)

TABLE 6-continued

| | Repeating unit of polymer chain (illustrated as (R) in the left column) | | |
|---|---|---|---|
| | Repeating unit derived from (meth)acrylate having $C_1$—$C_8$ linear, $C_3$—$C_8$ branched, $C_3$—$C_8$ cyclic or $C_6$—$C_8$ aromatic hydrocarbon group, or (meth)acrylic acid | | Repeating unit derived from (meth)acrylate including $C_9$—$C_{10}$ alicyclic hydrocarbon group |
| P-24 | Repeating unit 1 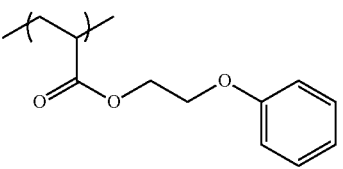 | — | Repeating unit 2 carbon number: 9 |
| P-25 | Repeating unit 1 | Repeating unit 2 carbon number: 4 | — |
| P-26 | Repeating unit 1 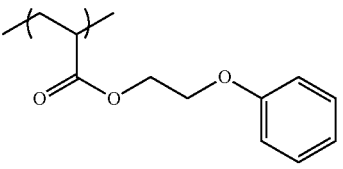 | — | Repeating unit 2 carbon number: 9 |
| P-27 | Repeating unit 1 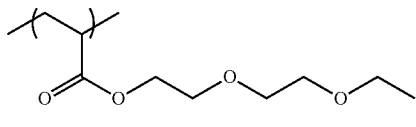 | Repeating unit 2 carbon number: 4 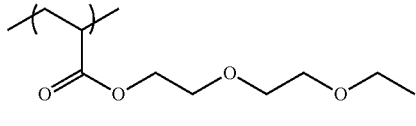 | — |

The weight-average molecular weight (Mw) of the (meth)acrylic resin is preferably in a range of from 1,000 to 30,000. When the weight-average molecular weight is 1,000 or more, adhesion of an image to a recording medium and film strength of an image further improve. A weight-average molecular weight of 30,000 or less suppresses an increase in the viscosity of the ink composition, and is advantageous in terms of stably maintaining the ejection performance.

For a reason similar to that described above, the weight-average molecular weight of the (meth)acrylic resin is preferably from 1,000 to 10,000, and more preferably from 1,000 to 5,000.

The weight-average molecular weight is measured using a gel permeation chromatograph (GPC).

In the GPC, a HLC®-8020GPC (manufactured by Tosoh Corporation) is used with three columns of TSKGEL® SuperMultiporeHZ-H (manufactured by Tosoh Corporation, 4.6 mm internal diameter (ID)×15 cm) as columns, and THF (tetrahydrofuran) as an eluant. The measurement is performed under conditions in which the sample concentration is 0.45% by mass, the flow rate is 0.35 ml/min, the sample injection amount is 10 μl, and the measurement temperature is 40° C., and an RI detector is used in the measurement. A calibration curve is prepared from eight samples of Standard Samples TSK standard polystyrene manufactured by Tosoh Corporation, specifically, F-40, F-20, F-4, F-1, A-5000, A-2500, A-1000, and n-propyl benzene.

The content of the (meth)acrylic resin (A) in the ink composition is preferably from 1% by mass to 15% by mass, more preferably from 1% by mass to 10% by mass, and still preferably from 3% by mass to 8% by mass, with respect to the total mass of the ink composition.

When the content of the (meth)acrylic resin (A) is 1% by mass or more, an image having excellent adhesion to a recording medium and excellent film strength tends to be obtained while an increase in the viscosity of the ink composition is suppressed and the ejection performance is stably maintained. A content of the (meth)acrylic resin (A) of 15% by mass or less is advantageous in terms of maintaining the ejection stability of the ink composition.

(B) Polymerization Initiator

The ink composition for inkjet recording according to the present disclosure includes at least one polymerization initiator. A polymerization initiator is a compound which generates a polymerization initiation species, which is an active species, upon irradiation of an active energy radiation. The polymerization initiator may be selected from known photopolymerization initiators and thermal polymerization initiators, as appropriate.

The active energy radiation is not particularly restricted as long as irradiation with therewith can apply an energy capable of generating an active species in the ink composition. Examples of the active energy radiation include an α-ray, a γ-ray, an X-ray, an ultraviolet ray, an infrared ray, a visible ray, and an electron beam. Among these, from the viewpoint of curing sensitivity and availability of a device, the active energy radiation is preferably an ultraviolet ray or an electron beam, and more preferably an ultraviolet ray.

The ink composition according to the present disclosure is preferably curable by irradiation with an ultraviolet ray as an active energy radiation.

As the polymerization initiator, radically polymerization initiators are preferable, and examples thereof include (a) aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, (m) α-aminoketone compounds, and (n) alkylamine compounds.

Examples of radically polymerization initiators include radically polymerization initiators described in paragraphs [0135] to [0208] in JP-A No. 2006-085049.

The polymerization initiator is preferably selected from the group consisting of (b) acylphosphine oxide compounds, (g) ketoxime ester compounds, (l) compounds having a carbon-halogen bond, and (m) α-aminoketone compounds, and more preferably selected from the group consisting of α-aminoketone compounds and acylphosphine oxide compounds, in consideration of excellent curing sensitivity thereof. Further, it is particularly preferable that both an α-aminoketone compound and an acylphosphine oxide compound are included as polymerization initiators, from the viewpoint of curing sensitivity.

Examples of the acylphosphine oxide compounds include compounds described in Japanese Patent Publication (JP-B) No. S63-40799, Japanese Patent Publication (JP-B) No. H5-29234, Japanese Patent Application Laid-Open (JP-A) No. H10-95788, and JP-A No. H10-29997. Commercially available acylphosphine oxide compounds may be used, and examples of the commercially available acylphosphine oxide compounds include IRGACURE® series and DAROCUR® series manufactured by BASF Corporation, such as IRGACURE 819, IRGACURE 1800, IRGACURE 1870, DAROCUR TPO and LUCIRIN® TPO.

Examples of the ketoxime ester compounds include compounds described in Japanese National-Phase Publication (JP-A) No. 2006-516246, JP-A No. 2001-233842, JP-A No. 2004-534797, JP-A No. 2005-097141, and JP-A No. 2006-342166.

Examples of the compounds having a carbon-halogen bond include triazine compounds, such as compounds described in JP-A No. H8-269049, JP-A No. 2005-503545 and J. Am, Chem. Soc. 1999, 121, p 6167 to 6175.

Examples of the α-aminoketone compounds include 2-methyl-1-phenyl-2-morpholinopropane-1-one, 2-methyl-1-[4-(hexyl)phenyl]-2-morpholinopropane-1-one, and 2-ethyl-2-dimethylamino-1-(4-morpholinophenyl)-butane-1-one.

Commercially available α-aminoketone compounds may be used, and examples of the commercially available α-aminoketone compounds include IRGACURE® series (such as IRGACURE 907, 369, and 379) manufactured by BASF Corporation.

In the case of using the ink composition according to the present disclosure as a white ink composition or a colorless (clear) ink composition, a polymerization initiator having an excellent discoloration resistance is preferably selected. Examples of favorable α-aminoketone compounds having such properties include IRGACURE® 907, and examples of favorable acylphosphine oxide compounds having such properties include IRGACURE® 819 and DAROCUR® TPO.

With respect to α-aminoketone compounds and acylphosphine oxide compounds as polymerization initiators, for example, polymerization initiators described in paragraphs [0044] to [0077] in JP-A No. 2010-235697 can preferably be used.

The ink composition according to the present disclosure may include only one polymerization initiator, or may include two or more polymerization initiators in combination.

The content of polymerization initiator in the ink composition for inkjet recording is preferably from 0.1% by mass to 30% by mass, more preferably from 1.0% by mass to 20% by mass, and still preferably from 3.0% by mass to 15% by mass, with respect to the total mass of the composition.

In the ink composition for inkjet recording according to the present disclosure, the content of polymerization initiator is preferably from 0.01 parts by mass to 35 parts by mass, and more preferably from 0.1 parts by mass to 30 parts by mass, with respect to 100 parts by mass of the polymerizable compound below.

(C) Polymerizable Compound

The ink composition for inkjet recording according to the present disclosure includes at least one polymerizable compound. The polymerizable compound may be appropriately selected from compounds having, in a molecule thereof, at least one radically polymerizable ethylenically unsaturated bond. The polymerizable compound may be any of a monomer, an oligomer, and or a mixture thereof, and is preferably a monomer.

Examples of the polymerizable compound include: radically polymerizable monomers such as unsaturated carboxylic acids such as acrylic acid, methacrylic acid, itaconic acid, crotonic acid, isocrotonic acid, and maleic acid, and salts thereof, esterified products thereof, and amide compounds thereof; anhydrides having an ethylenically unsaturated group; acrylonitrile; styrene; unsaturated polyesters; unsaturated polyethers; unsaturated polyamides; and unsaturated urethanes.

Specific examples of the polymerizable compound include: an ester of an unsaturated carboxylic acid and a polyhydric alcohol compound; an amide of an unsaturated carboxylic acid and a polyamine compound; a product of addition reaction of an unsaturated carboxylic acid ester or an amide having a nucleophilic substituent such as a hydroxy group, an amino group, or a mercapto group and a monofunctional or multifunctional isocyanate compound or epoxy compound; and a product of dehydration condensation of an unsaturated carboxylic acid ester or amide having a nucleophilic substituent and a monofunctional or multifunctional carboxylic acid.

Other examples of the polymerizable compound include: a product of addition reaction of an unsaturated carboxylic acid ester or amide having an electrophilic substituent such as an isocyanate group or an epoxy group and a monofunctional or multifunctional alcohol, amine, or thiol; and a product of substitution reaction of an unsaturated carboxylic acid ester or amide having a leaving substituent such as a halogen group or a tosyloxy group and a monofunctional or multifunctional alcohol, amine, or thiol. Further examples of the polymerizable compounds include compounds obtainable by replacing the unsaturated carboxylic acids in the above compounds with an unsaturated phosphonic acid, styrene, or vinyl ether.

Other than the above-described compounds, examples of the polymerizable compound also include polymerizable compounds described in, for example, JP-A No. 2006-508380, JP-A No. 2002-287344, JP-A No. 2008-256850, JP-A No. 2001-342222, JP-A No. H9-179296, JP-A No. H9-179297, JP-A No. H9-179298, JP-A No. 2004-294935, JP-A No. 2006-243493, JP-A No. 2002-275129, JP-A No. 2003-64130, JP-A No. 2003-280187, and JP-A No. H10-333321.

The ink composition according to the present disclosure may include as the polymerizable compound at least one monofunctional polymerizable compound. The term "monofunctional polymerizable compound" refers to a compound including, in a molecule thereof, only one radically polymerizable ethylenically unsaturated bond.

When the ink composition includes a monofunctional polymerizable compound, the ink composition has a reduced viscosity and excellent curability since the curing due to polymerization proceeds fast and the monofunctional polymerizable compound also serves as a solvent for the ink composition. Even when the ink composition according to the present disclosure includes no solvent or less than 5% by mass of solvent, the viscosity of the ink composition can be maintained low, and a reduction in the amount of the solvent achieved by including a monofunctional polymerizable compound reduces an odor due to volatilization of the solvent, and also reduces the amount of ingredients not contributing to curing. Therefore, the inclusion of a monofunctional polymerizable compound is also advantageous in terms of improving the curability.

Examples of the monofunctional polymerizable compound include: acrylic acid derivatives, examples of which include acrylate compounds such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, oligoester acrylate, epoxy acrylate, 2-phenoxyethyl acrylate, cyclic trimethylol propane formal acrylate, isobornyl acrylate, tetrahydrofurfuryl acrylate, 2-(2-ethoxyethoxy)ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, and 4-t-butylcyclohexyl acrylate, and acrylamide compounds such as N-methylol acrylamide, diacetone acrylamide, and N-hydroxyethyl acrylamide; methacrylic acid derivatives, examples of which indluces methacrylates such as methyl methacrylate, n-butyl methacrylate, 2-ethylhexyl methacrylate, lauryl methacrylate, allyl methacrylate, glycidyl methacrylate, benzyl methacrylate, and dimethylamino methyl methacrylate; derivatives of allyl compounds, such as allyl glycidyl ethers; and N-vinylcaprolactam (NVC).

The monofunctional polymerizable compound is preferably selected from the group consisting of N-vinylcaprolactam, 2-phenoxyethyl acrylate, cyclic trimethylol propane formal acrylate, isobornyl acrylate, tetrahydrofurfuryl acrylate, 2-(2-ethoxyethoxy)ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, and 4-t-butylcyclohexyl acrylate, in consideration of excellent curability thereof.

From the viewpoint of improving the film strength of an image, the ink composition according to the present disclosure preferably includes at least one multifunctional polymerizable compound. The term "multifunctional polymerizable compound" refers to a compound including, in a molecule thereof, at least two radically polymerizable ethylenically unsaturated bonds.

Examples of the multifunctional polymerizable compound include: acrylic acid derivatives, examples of which include acrylate compounds such as bis(4-acryloxypolyethoxyphenyl) propane, neopentylglycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, or dipentaerythritol tetraacrylate; methacrylic acid derivatives such as methacrylate compounds such as trimethylol propane trimethacrylate, tetramethylol methane tetramethacrylate, 1,6-hexanediol dimethacrylate, ethylene glycol dimethacrylate, triethylene glycol dimethacrylate, polyethylene glycol dimethacrylate, polypropylene glycol dimethacrylate, trimethylol ethane trimethacrylate, trimethylol propane trimethacrylate, and 2,2-bis(4-methacryloxy polyethoxyphenyl) propane; allyl compound derivatives such as diallylphthalate and triallyl trimellitate; and di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylol propane trivinyl ether.

Among others, as the multifunctional polymerizable compound, a multifunctional acrylate having, in a molecule thereof, two or more radically polymerizable ethylenically unsaturated bonds is preferable.

Examples of the multifunctional acrylate include a compound having, in a molecule thereof, 2 to 8 radically polymerizable ethylenically unsaturated bonds, and the multifunctional acrylate is preferably a compound having 2 to 6 radically polymerizable ethylenically unsaturated bonds.

Specific examples of the multifunctional polymerizable compound include multifunctional (meth)acrylate compounds such as bis(4-(meth)acryloxypolyethoxyphenyl) propane, tripropylene glycol di(meth)acrylate, polyethylene glycol di(meth)acrylate, polypropylene glycol di(meth)acrylate, dipentaerythritol tetra(meth)acrylate, trimethylol propane (propylene oxide (PO) modified) tri(meth)acrylate, oligoester(meth)acrylate, hydroxypivalic acid neopentylglycol di(meth)acrylate, tetramethylol methane tri(meth)acrylate, dimethylol tricyclodecane di(meth)acrylate, modified glycerol tri(meth)acrylate, dipentaerythrytol hexaacrylate, bisphenol A diglycidyl ether(meth)acrylic acid adduct, modified bisphenol A di(meth)acrylate, bisphenol A PO adduct di(meth)acrylate, bisphenol A ethylene oxide (EO) adduct di(meth)acrylate, 3-methyl-1,5-pentanediol di(meth) acrylate, dipropylene glycol di(meth)acrylate, trimethylol propane triacrylate, dipentaerythritol hexa(meth)acrylate, propylene glycol diglycidyl ether(meth)acrylic acid adduct, and ditrimethylol propane tetra(meth)acrylate. Other examples of the multifunctional polymerizable compound include allyl compounds such as diallyl phthalate and triallyl trimellitate.

Multifunctional vinyl ethers are also preferable as multifunctional polymerizable compounds. Examples of multifunctional vinyl ethers include: divinyl ethers such as ethylene glycol divinyl ether, diethylene glycol divinyl ether, triethylene glycol divinyl ether, polyethylene glycol divinyl ether, propylene glycol divinyl ether, dipropylene glycol divinyl ether, butylene glycol divinyl ether, butanediol divinyl ether, hexanediol divinyl ether, cyclohexane dimethanol divinyl ether, bisphenol A alkylene oxide divinyl ether, and bisphenol F alkylene oxide divinyl ether; and multifunctional vinyl ethers such as trimethylol ethane trivinyl ether, trimethylol propane trivinyl ether, ditrimethylol propane tetravinyl ether, glycerol trivinyl ether, pentaerythritol tetravinyl ether, dipentaerythritol pentavinyl ether, dipentaerythritol hexavinyl ether, ethylene oxide-trimethylol propane adduct trivinyl ether, propylene oxide-trimethylol propane adduct trivinyl ether, ethylene oxide-ditrimethylol propane adduct tetravinyl ether, propylene oxide-ditrimethylol propane adduct tetravinyl ether, ethylene oxide-pentaerythritol adduct tetravinyl ether, propylene oxide-pentaerythritol adduct tetravinyl ether, ethylene oxide-dipentaerythritol adduct hexavinyl ether, and propylene oxide-dipentaerythritol adduct hexavinyl ether. Among the multifunctional vinyl ether compounds, divinyl ether compounds are particularly preferable.

In addition to the those described above, further examples of the multifunctional polymerizable compound include photosetting polymerizable compounds for use in photopolymerizable compositions described in, for example, JP-A No. H7-159983, JP-B No. H7-31399, JP-A No. H8-224982, JP-A No. H10-863, JP-A No. H9-134011, and JP-A No. 2004-514014.

As the multifunctional polymerizable compound, a multifunctional acrylate is preferable. More specifically, dipentaerythrytol hexaacrylate, 3-methyl-1,5-pentanediol diacrylate, dipropylene glycol diacrylate, and trimethylol propane triacrylate are preferable in consideration of excellent curability thereof.

The content of polymerizable compound in the ink composition according to the present disclosure is preferably from 45% by mass to 90% by mass, more preferably from 50% by mass to 80% by mass, and further preferably from 55% by mass to 80% by mass with respect to the total mass of the ink composition.

When the ink composition according to the present disclosure includes a monofunctional polymerizable compound, the viscosity thereof can easily be adjusted so as to be appropriate for image recording by ejecting the ink composition using an inkjet method, and an image having excellent film strength and excellent adhesion to a recording medium can be obtained.

When the ink composition includes a multifunctional polymerizable compound, the content of the multifunctional polymerizable compound is preferably 20% by mass or less, and more preferably 10% by mass or less, with respect to the total amount of the polymerizable compound. The lower limit of the content of the multifunctional polymerizable compound is not particularly restricted, and all the polymerizable compounds included in the ink composition may be one or more monofunctional polymerizable compounds.

In order to improve the film strength of an image by including a multifunctional polymerizable compound in the ink composition, the content of the multifunctional polymerizable compound is preferably 5% by mass or more with respect to the total amount of the polymerizable compound.

(D) Colorant

The ink composition for inkjet recording according to the present disclosure may include at least one colorant. Inclusion of a colorant enables a colored ink composition to be obtained, and a visible image to be be formed.

The colorant is not particularly restricted, and may be appropriately selected from a variety of known colorants (pigments, dyes) in accordance with applications. For example, for the purpose of forming an image having an excellent weather resistance, pigments are suitable. As dyes, water-soluble dyes and oil-soluble dyes are both applicable, and oil-soluble dyes are preferable.

It is not essential that the ink composition according to the present disclosure include a colorant, and the ink composition may also be used as a colorless and transparent (clear) ink composition that does not includes a colorant.

(Pigment)

The pigment is not particularly limited, and may be either an organic pigment or an inorganic pigment. For example, a dispersion pigment in which a pigment is dispersed in, for example, an insoluble resin as a dispersion medium, or a surface-treated pigment in which a resin is formed on the surface of a pigment by graft polymerization may be used. Organic resin pigments in which resin particles are dyed with a dye are also usable.

Examples of pigments include pigments described in Seishiro Ito, ed., *Dictionary of Pigments* (published in 2000), W. Herbst, K. Hunger *Industrial Organic Pigments*, JP-A No. 2002-12607, JP-A No. 2002-188025, JP-A No. 2003-26978, and JP-A No. 2003-342503.

Among specific examples of organic pigments and inorganic pigments, specific examples of yellow pigments include monoazo pigments such as C.I. Pigment Yellow 1 (for example, Fast Yellow G) and C.I. Pigment Yellow 74, disazo pigments such as C.I. Pigment Yellow 12 (for example, Disazo Yellow AAA) and C.I. Pigment Yellow 17, non-benzine azo pigments such as C.I. Pigment Yellow 180, azo lake pigments such as C.I. Pigment Yellow 100 (for example, Tartrazine Yellow Lake), condensed azopigments such as C.I. Pigment Yellow 95 (for example, Condensed Azo Yellow GR), acidic dye lake pigments such as C.I. Pigment Yellow 115 (for example, Quinoline Yellow Lake), basic dye lake pigments such as C.I. Pigment Yellow 18 (for example, Thioflavin Lake), anthraquinone pigments such as Flavanthrone Yellow (Y-24), isoindolinone pigments such as Isoindolinone Yellow 3RLT (Y-110), quinophthalone pigments such as Quinophthalone Yellow (Y-138), isoindoline pigments such as Isoindoline Yellow (Y-139), nitroso pigments such as C.I. Pigment Yellow 153 (for example, Nickel Nitroso Yellow), and metal complex salt-based azomethine pigments such as C.I. Pigment Yellow 117 (for example, Copper Azomethine Yellow).

Examples of red or magenta pigments include monoazo pigments such as C.I. Pigment Red 3 (for example, Toluidine Red), disazo pigments such as C.I. Pigment Red 38 (for example, Pyrazolone Red B), azo lake pigments such as C.I. Pigment Red 53:1 (for example, Lake Red C) or C.I. Pigment Red 57:1 (Brilliant Carmine 6B), condensed azo pigments such as C.I. Pigment Red 144 (for example, Condensed Azo Red BR), acidic dye lake pigments such as C.I. Pigment Red 174 (for example, Phloxine B Lake), basic dye lake pigments such as C.I. Pigment Red 81 (for example, Rhodamine 6G'Lake), anthraquinone pigments such as C.I. Pigment Red 177 (for example, Dianthraquinonyl Red), thioindigo pigments such as C.I. Pigment Red 88 (for example, Thioindigo Bordeaux), perinone pigments such as C.I. Pigment Red 194 (for example, Perinone Red), perylen pigments such as C.I. Pigment Red 149 (for example, Perylen Scarlet), quinacridone pigments such as C.I. Pigment Violet 19 (unsubstituted quinacridone) or C.I. Pigment Red 122 (for example, Quinacridone Magenta), isoindolinone pigments such as C.I. Pigment Red 180 (for example, Isoindolinone Red 2BLT), and alizarin lake pigments such as C.I. Pigment Red 83 (for example, Madder Lake).

Examples of blue or cyan pigments include disazo pigments such as C.I. Pigment Blue 25 (for example, Dianisidine Blue), phthalocyanine pigments such as C.I. Pigment Blue 15:3 and C.I. Pigment Blue 15 (for example, Phthalocyanine Blue), acidic dye lake pigments such as C.I. Pigment Blue 24 (for example, Peacock Blue Lake), basic dye lake pigments such as C.I. Pigment Blue 1 (for example, Victoris Pure Blue BO Lake), anthraquinone pigments such as C.I. Pigment Blue 60 (for example, Indanthrone Blue), and Alkali Blue pigments such as C.I. Pigment Blue 18 (Alkali Blue V-5:1).

Examples of green pigments include phthalocyanine pigments such as C.I. Pigment Green 7 (Phthalocyanine Green) and C.I. Pigment Green 36 (Phthalocyanine Green), and azo metal complex pigments such as C.I. Pigment Green 8 (Nitroso Green).

Examples of orange pigments include isoindoline pigments such as C.I. Pigment Orange 66 (Isoindoline Orange) and anthraquinone pigments such as C.I. Pigment Orange 51 (Dichloropyranthrone Orange).

Examples of black pigments include carbon black (for example, C.I. Pigment Black 7), titanium black, and aniline black.

Examples of white pigments include basic lead carbonate ($2PbCO_3Pb(OH)_2$, also referred to as silver white), zinc oxide (ZnO, also referred to as zinc white), titanium oxide ($TiO_2$, also referred to as titanium white), and strontium titanate ($SrTiO_3$, also referred to as titanium strontium white).

Titanium oxide has a small specific gravity and a large refractive index, and is chemically and physically stable, compared with other white pigments. Therefore, titanium oxide has a high shielding properties and coloring properties as a pigment, and titanium oxide also has excellent resistance to, for example, acid, alkali, and the environment. Accordingly, titanium oxide is preferable as a white pigment. Other white pigments than those described above may be used, as needed.

A pigment may be dispersed using a dispersing device, such as a ball mill, a sand mill, an attritor, a roll mill, a jet mill, a homogenizer, a paint shaker, a kneader, an agitator, a Henschel mixer, a colloid mill, an ultrasonic homogenizer, a pearl mill, or a wet jet mill.

The dispersing of a pigment may be performed with addition of a dispersant. Examples of the dispersant include a hydroxyl group-containing carboxylic acid ester, a salt of a long chain polyaminoamide and a high molecular weight acid ester, a salt of a high molecular weight polycarboxylic acid, a high molecular weight unsaturated acid ester, a copolymer of high molecular weight compounds, a modified polyacrylate, an aliphatic polycarboxylic acid, a naphthalenesulfonic acid formalin condensate, a polyoxyethylene alkyl phosphate ester, and a pigment derivative. Commercially available polymeric dispersants, such as Solsperse series manufactured by Zeneca Inc., can preferably be used.

A dispersion aid may be used, and a synergist suitable for the kind of pigment may be used as the dispersion aid.

The dispersant and dispersion aid are preferably added in an amount of from 1 part by mass to 50 parts by mass with respect to 100 parts by mass of the pigment.

The volume average particle diameter of the pigment is preferably from 0.02 μm to 0.6 μm, more preferably from 0.02 μm to 0.1 μm, and further preferably from 0.02 μm to 0.07 μm. The volume average particle diameter of the pigment is a value as measured by a laser diffraction/scattering particle size distribution analyzer (LA-920, manufactured by HORIBA, Ltd.) with tripropylene glycol methyl ether as a measurement solvent.

The volume average particle diameter of the pigment can be adjusted to be within the above-described range based on the selection of the pigment, the dispersant, and the dispersion medium and the adjustment of the dispersion conditions and the filtration conditions. Controlling the particle diameter enables suppression of clogging of head nozzles, and enables the maintenance of the storage stability, transparency and curing sensitivity of the ink composition.

(Dye)

As dyes, oil-soluble dyes are preferable. An oil-soluble dye refers to a dye of which the solubility in water (the mass of the pigment which dissolves in 100 g of water) at 25° C. is 1 g or less, and the solubility is preferably 0.5 g or less, and further preferably 0.1 g or less. That is, water-insoluble oil-soluble dyes are preferably used as dyes.

When a colorant is used, the content of the colorant in the ink composition is preferably from 0.05% by mass to 20% by mass, and more preferably from 0.2% by mass to 10% by mass, with respect to the total amount of the ink composition. When an oil-soluble dye is used as a colorant, the content thereof is particularly preferably from 0.2% by mass to 6% by mass with respect to the total amount (including any solvent) of the ink composition.

When the content of the colorant is in the above-described ranges, the color density of an image is favorable, and favorable curability of the ink composition can be maintained.

(E) Other Additives

Besides the above-described ingredients, the ink composition for inkjet recording according to the present disclosure may further include a sensitizer, a cosensitizer, an antioxidant, a polymerization inhibitor, a solvent, water, a surfactant, an ultraviolet absorber, a fading inhibitor, an electroconductive salt, and other additives as long as an effect according to the present disclosure is not impaired.

—Sensitizer—

The ink composition according to the present disclosure may include a sensitizer. As the sensitizer, any compound that sensitizes the polymerization initiator by an electron transfer mechanism or an energy transfer mechanism may be used, and the sensitizer may be selected from known sensitizers, as appropriate.

Examples of preferred sensitizers include the following compounds having an absorption wavelength in a wavelength region of from 350 nm to 450 nm.

Specific examples of the sensitizer include: polynuclear aromatic compounds such as anthracene pyrene, perylene, and triphenylene; thioxanthone compounds such as isopropyl thioxanthone; xanthene compounds such as fluorescein, eosine, erythrosine, rhodamine B, and rose bengal; cyanine compounds such as thiacarbocyanine and oxacarbocyanine; merocyanine compounds such as merocyanine and carbomerocyanine; thiazine compounds such as thionine, Methylene Blue, and Toluidine Blue; acridine compounds such as acridine orange, chloroflavin, and acriflavin; anthraquinone compounds; squarylium compounds; and coumarin compounds such as 7-diethylamino-4-methyl coumarin. Polynuclear aromatic compounds and thioxanthone compounds are preferable due to superior curability thereof.

Further, sensitizing colorants described in JP-A No. 2008-95086 are also usable.

—Cosensitizer—

The ink composition according to the present disclosure may also include a cosensitizer. The cosensitizer further improves the sensitivity of the sensitizer to an active energy radiation, or has an activity such as suppressing the inhibition of polymerization of the polymerizable compound due to oxygen.

Examples of the cosensitizer include amines such as compounds described in M. R. Sander et al. *Journal of Polymer Science*, volume 10, p 3173 (1972), JP-B No. S44-20189, Japanese Patent Application Laid-Open (JP-A) No. S51-82102, JP-A No. S52-134692, JP-A No. S59-138205, JP-A No. S60-84305, JP-A No. S62-18537, JP-A No. S64-33104, and *Research Disclosure* No. 33825, and specific examples the cosensitizer include triethanolamine, p-dimethylamino benzoic acid ethyl ester, p-formyl dimethyl aniline, and p-methylthio dimethyl aniline.

Other examples of the cosensitizer include thiol compounds and sulfide compounds, and specific examples of the cosensitizer include thiol compounds described in JP-A No. S53-702, JP-B No. S55-500806, and JP-A No. H5-142772, and disulfide compounds described in JP-A No. S56-75643. Specific examples thereof include 2-mercaptobenzothiazole, 2-mercaptobenzoxazole, 2-mercaptobenzimidazole, 2-mercapto-4(3H)-quinazoline, and β-mercaptonaphthalene.

Further examples of the cosensitizer include amino acid compounds (for example, N-phenylglycine), organic metal compounds (for example, tributyl tin acetate) described in JP-B No. S48-42965, hydrogen donors described in JP-B No. S55-34414, sulfur compounds (for example, trithiane) described in JP-A No. H6-308727, phosphorus compounds (for example, diethyl phosphite) described in JP-A No. H6-250387, and Si—H or Ge—H compounds described in JP-A No. H8-54735.

—Antioxidant—

The ink composition according to the present disclosure may include an antioxidant as long as the effect according to the present disclosure is not impaired. The inclusion of an antioxidant improves the stability of the ink composition.

Examples of the antioxidant include a compound described in EP-A No. 223739, EP-A No. 309401, EP-A No. 309402, EP-A No. 310551, EP-A No. 310552, EP-A No. 459416, DE-A No. 3435443, JP-A No. S54-48535, JP-A No. S62-262047, JP-A No. S63-113536, JP-A No. S63-163351, JP-A No. H2-262654, JP-A No. H2-71262, JP-A No. H3-121449, JP-A No. H5-61166, JP-A No. H5-119449, U.S. Pat. No. 4,814,262, or U.S. Pat. No. 4,980,275.

The content of the antioxidant is appropriately selected in accordance with the purpose, and, in general, the content of the antioxidant is approximately from 0.1% by mass to 8% by mass with respect to the total amount of the ink composition.

—Polymerization Inhibitor—

The ink composition according to the present disclosure preferably includes a polymerization inhibitor. The inclusion of a polymerization inhibitor further improves the storage stability of the ink composition against thermal polymerization.

It is considered favorable that the ejection of an ink composition is performed after the ink composition is heated to a temperature range of from 40° C. to 80° C. to decrease the viscosity thereof, using an inkjet recording apparatus. Therefore, in many cases, ink compositions are usually ejected after the temperature thereof has been adjusted to the temperature range. In the present disclosure, the ink composition preferably includes a polymerization inhibitor in order to prevent head clogging caused by undesired thermal polymerization when heated.

Examples of the polymerization inhibitor include hydroquinone, benzoquinone, p-methoxyphenol, tetramethylpiperidine-1-oxyl (TEMPO), 1-oxyl-2,2,6,6-tetramethyl-4-hydroxypiperidine (TEMPOL), and aluminum-cupferron complex (cupferron Al). Commercially available polymerization inhibitors may also be used, examples of which include GENORAD 16 (trade name; manufactured by Rahn AG).

When the ink composition includes a polymerization inhibitor, the content of the polymerization inhibitor is preferably from 200 ppm to 20,000 ppm with respect to the total amount of the ink composition.

—Organic Solvent—

The ink composition according to the present disclosure may include an organic solvent. The inclusion of an organic solvent further improves the adhesion of an image to a recording medium after curing.

Examples of the organic solvent include a ketone such as acetone, methyl ethyl ketone, or diethyl ketone; an alcohol such as methanol, ethanol, 2-propanol, 1-propanol, 1-butanol, or tert-butanol; a chlorine-based solvent such as chloroform or methylene chloride; an aromatic solvent such as benzene or toluene; an ester-based solvent such as ethyl acetate, butyl acetate, or isopropyl acetate; an ether-based solvent such as diethyl ether, tetrahydrofuran, or dioxane; and a glycol ether-based solvent such as ethylene glycol monomethyl ether or ethylene glycol dimethyl ether.

When an organic solvent is used, the organic solvent is preferably added in a range in which the recording medium can tolerate and in which an odor or the like during ejection or curing is not generated. Accordingly, the content of the organic solvent is preferably 5% by mass or less, more preferably from 0.01% by mass to 5% by mass, and further preferably from 0.01% by mass to 3% by mass, with respect to the total amount of the ink composition.

—Water—

The ink composition according to the present disclosure may include water in a range in which the effect according to the present disclosure is not impaired.

It is preferable that the ink composition according to the present disclosure does not substantially contain water, and is prepared as a non-aqueous ink. Specifically, the content of water in the ink composition is preferably 3% by mass or less, more preferably 2% by mass or less, and most preferably 1% by mass or less, with respect to the total amount of the ink composition.

—Surfactant—

The ink composition according to the present disclosure may include a surfactant.

Examples of the surfactant include surfactants described in JP-A No. S62-173463 and JP-A No. S62-183457. Examples of the surfactant include: anionic surfactants such as dialkyl sulfosuccinates, alkyl naphthalene sulfonates and fatty acid salts; nonionic surfactants such as polyoxyethylene alkyl ethers, polyoxyethylene alkylarylethers, acetylene glycol and polyoxyethylene-polyoxypropylene block copolymers; and cationic surfactants such as alkylamine salts and quaternary ammonium salts.

An organic fluoro compound not having a polymerizable group may be used instead of a surfactant. The organic fluoro compound is preferably hydrophobic. Examples of the organic fluoro compound include fluorine-containing surfactants, oily fluorine-containing compounds (for example, fluorine oils) and solid fluorine compound resins (for example, tetrafluoroethylene resins), and compounds described in JP-B No. S57-9053 (8th to 17th columns) and JP-A No. S62-135826.

—Ultraviolet Absorber—

The ink composition according to the present disclosure may include an ultraviolet absorber as long as the effect according to the present disclosure is not impaired. It is expected that the inclusion of an ultraviolet absorber produces effects with respect to improvement of the weather resistance of a formed image and prevention of the fading of the image.

Examples of the ultraviolet absorber include: benzotriazole compounds described in JP-A No. S58-185677, JP-A No. S61-190537, JP-A No. H2-782, JP-A No. H5-197075, and JP-A No. H9-34057; benzophenone compounds described in JP-A No. S46-2784, JP-A No. H5-194483, and U.S. Pat. No. 3,214,463; cinnamic acid compounds described in JP-B No. S48-30492, JP-B No. S56-21141, and JP-A No. H10-88106; triazine compounds described in JP-A No. H4-298503, JP-A No. H8-53427, JP-A No. H8-239368, JP-A No. H10-182621, Japanese National-Phase Publication (JP-A) No. H8-501291, and a compound described in *Research Disclosure* No. 24239; and compounds which absorb ultraviolet rays to emit fluorescence, also referred to as fluorescent brightening agent, typified by stilbene and benzoxazole compounds.

The content of the surfactant may appropriately be selected in accordance with the purpose. In general, the content of the surfactant is preferably from about 0.5% by mass to about 15% by mass with respect to the total amount of the ink composition.

—Fading Inhibitor—

The ink composition according to the present disclosure may include a fading inhibitor selected from a variety of organic compounds and metal complex compounds. Examples of fading inhibitors that are organic compounds include hydroquinone compounds, alkoxyphenol compounds, dialkoxyphenol compounds, phenol compounds, aniline compounds, amine compounds, indane compounds, chroman compounds, alkoxyaniline compounds, and heterocyclic compounds. Examples of fading inhibitors that are metal complex compounds include nickel complexes and zinc complexes, and specific examples of the fading inhibitor include compounds described in patents cited in *Research Disclosure* No. 17643, section VII, items Ito J, *Research Disclosure* No. 15162, *Research Disclosure* No. 18716 p 650, left column, *Research Disclosure* No. 36544, p 527, *Research Disclosure* No. 307105, p 872, and *Research Disclosure* No. 15162, and compounds encompassed by general formulae of representative compounds and examples of compounds described in p 127 to p 137 of JP-A No. S62-215272.

The content of the fading inhibitor is appropriately selected in accordance with the purpose, and, generally, the content of the fading inhibitor is approximately from 0.1% by mass to 8% by mass with respect to the total amount of the ink composition.

—Electroconductive Salt—

The ink composition according to the present disclosure may include an electroconductive salt such as potassium thiocyanate, lithium nitrate, ammonium thiocyanate, or dimethylamine hydrochloride. The inclusion of an electroconductive salt enables the control of ejection properties.

—Other Additives—

The ink composition according to the present disclosure may include, for example, known additives such as leveling agents, matting agents, waxes for adjusting film physical properties, and tackifiers which do not inhibit polymerization, in accordance with the necessity. By using a known additive such as a tackifier, adhesion to a recording medium such as polyolefin or polyester (for example, polyethylene terephthalate (PET)) can be improved.

Examples of the tackifier include high molecular weight adhesive polymers described in pp. 5 to 6 of JP-A No. 2001-49200 (such as a copolymer formed of an ester of (meth)acrylic acid and an alcohol having a $C_1$ to $C_{20}$ alkyl group, an ester of (meth)acrylic acid and a $C_3$ to $C_{14}$ alicyclic alcohol, or an ester of (meth)acrylic acid and a $C_6$ to $C_{14}$ aromatic alcohol), and tackiness-imparting low molecular weight resins having a polymerizable unsaturated bond.

—Physical Properties of Ink Composition—

The viscosity of the ink composition according to the present disclosure at 25° C. is preferably in a range of from 10 mPa·s to 50 mPa·s, and more preferably in a range of from 10 mPa·s to 30 mPa·s. The viscosity of the ink composition can be adjusted by adjusting the composition and the content ratios in the ink composition.

When the viscosity of the ink composition is in the above-described range, ejection by an inkjet recording apparatus can be favorably performed.

The viscosity of the ink composition is a value as measured by an RE-85L (manufactured by Toki Sangyo Co., Ltd.) at 25° C.

The surface tension of the ink composition according to the present disclosure is preferably from 20 mN/m to 30 mN/m, and more preferably from 23 mN/m to 28 mN/m. In cases in which recording is performed on a variety of recording media such as polyolefin substrates, polyester substrates (for example, polyethylene terephthalate (PET) sheets), coated paper, and non-coated paper, a surface tension of 20 mN/m or more is advantageous in terms of the balance of bleeding of the ink composition and penetration into the recording media, and a surface tension of 30 mN/m or less is advantageous in terms of wettability.

The surface tension is a value as measured by a surface tensiometer DY-700 (manufactured by Kyowa Interface Science Co., LTD.) at a temperature of 30° C.

The ink composition for inkjet recording according to the present disclosure can be prepared by mixing the above-described ingredients (A) to (C), colorant (D), and other additives.

<Inkjet Recording Method>

The inkjet recording method according to the present disclosure includes: a process (also referred to as the "ink ejection process" hereinafter) of ejecting the above-described ink composition for inkjet recording according to the present disclosure onto a recording medium using an inkjet recording apparatus; and a process (also referred to as the "curing process" hereinafter) of irradiating the ejected ink composition with an active energy radiation to cure the ink composition.

In the inkjet recording method according to the present disclosure, since the ink composition according to the present disclosure is used, an image having an excellent film strength and excellent adhesion to a recording medium can be obtained while the ejection performance is stably maintained.

—Ink Ejection Process—

In the ink ejection process, the ink composition for inkjet recording according to the present disclosure is ejected onto a recording medium using a inkjet recording apparatus.

In this process, the ink composition is ejected preferably after the viscosity of the ink composition is adjusted to be from 3 mPa·s to 15 mPa·s (preferably from 3 to 13 mPa·s) by being heated to a temperature of from 25° C. to 80° C. By adjusting the viscosity, the ejection stability can be improved.

Fluctuation in the viscosity of the ink composition largely influences the droplet size and the ejection speed. Therefore, the temperature of the ink composition during the ejection is preferably maintained as constant as possible. From such a viewpoint, the temperature of the ink composition is preferably controlled within a range of the set temperature ±5° C., more preferably within a range of the set temperature ±2° C., and further preferably within the range of the set temperature ±1° C.

The ink composition is used for forming an image by being ejected from an inkjet head. The type of the inkjet head for ejecting the ink composition is not particularly restricted, and the inkjet head is preferably an inkjet head having a nozzle plate in which nozzle holes are two-dimensionally arranged and in which the surface of the nozzle plate on the ink ejection side has been treated to have affinity for ink.

The inkjet recording apparatus and an inkjet head to be mounted thereon is described below in detail.

—Curing Process—

After the ink ejection process, the ink composition ejected in the ink ejection process is cured by being irradiated with an active energy radiation. As a result of this process, a cured image having an excellent film strength and excellent adhesion to the recording medium can be obtained.

Due to the irradiation with an active energy radiation, an energy required for the curing reaction is applied to the ink composition deposited on the recording medium. Examples of the active energy radiation include α-ray, γ-ray, X-ray, ultraviolet ray, infrared ray, visible ray, and electron beam. Among these, as the active energy radiation, an ultraviolet ray or electron beam is preferable, and an ultraviolet ray having a peak wavelength in a range from 340 nm to 400 nm is more preferable, from the viewpoint of curing sensitivity and availability of the device.

Examples of favorable light sources for radiation of ultraviolet rays include a mercury lamp, a gas laser, a solid state laser, a GaN-based semiconductor ultraviolet light emitting device, a light emitting diode (LED), and a laser diode (LD), in consideration of their small-size, long life, high efficiency and low cost. In particular, examples of light sources suitable for radiation of ultraviolet rays include ultraviolet LED (UV-LED) and ultraviolet LD (UV-LD) such as an UV-LED manufactured by NICHIA CORPORATION having a main emission spectrum at a wavelength between 365 nm and 420 nm. For irradiation with a light having a shorter wavelength, for example, an LED which can emit an active energy radiation centered between 300 nm and 370 nm and which is described in U.S. Pat. No. 6,084,250 can be applied.

Among others, UV-LEDs are preferable as light sources which can perform radiation of an active energy radiation, and UV-LEDs having a peak wavelength in a range from 340 nm to 400 nm are particularly preferable.

The ink composition according to the present disclosure is cured with a high sensitivity even by a low output active energy radiation, and an image having an excellent film strength is obtained. The illuminance of the active energy radiation for irradiation is preferably from 10 mW/cm$^2$ to 4,000 mW/cm$^2$, and more preferably from 20 mW/cm$^2$ to 2,500 mW/cm$^2$.

The irradiation method may be a method disclosed in JP-A No. S60-132767. Specifically, a light source is provided on both sides of a head unit, and the head and the light sources are moved in a scanning manner using a shuttle method. The irradiation is performed after a certain period from the deposition of the ink. Further, curing is completed by another, non-driven light source. Also, WO99/54415 discloses an irradiation method using an optical fiber and an irradiation method in which a collimated light from a light source is directed to a mirror face provided on a side face of a head unit so as to irradiate a deposited ink composition with ultraviolet rays.

When an image is printed by an inkjet recording apparatus using the ink composition according to the present disclosure, irradiation with an active energy radiation is performed preferably for from 0.01 second to 120 seconds, and more preferably for from 0.1 second to 90 seconds. The conditions and basic method of irradiation with an active energy radiation are disclosed in JP-A No. S60-132767.

In the inkjet recording method according to the present disclosure, the ink composition is preferably heated to a fixed temperature and the time period from the deposition of the ink composition to the irradiation is preferably set to be from 0.01 second to 0.5 seconds, more preferably from 0.01 second to 0.3 seconds, and further preferably 0.01 second to 0.15 seconds. After this time period has passed, irradiation with a radiation is performed. Controlling the time period from the deposition to the irradiation to be quite short as described above, bleeding of the deposited ink before curing can be prevented. Even when the recording medium is porous, the irradiation is performed before the ink composition penetrates into a deep portion at which light from the light source does not reach. Therefore, a residual unreacted portion of the polymerizable compound is reduced, and, as a result, the film strength of the image improves and an odor during the irradiation is reduced.

In order to obtain a multicolor image, it is preferable that the image is formed by sequentially applying ink compositions having mutually different colors in the order of ascending brightness. It is expected that sequentially applying ink compositions having different colors in the order of ascending brightness realizes a favorable curing sensitivity, a reduction in the residual polymerizable compound, and improvement of adhesion to the substrate because the active energy radiation more easily reaches the ink composition located at the deeper portion. The irradiation may be performed all at once after all of the desired color ink compositions have been ejected, or the irradiation may be performed every time a single-color ink composition has been deposited on the recording medium. Performing the irradiation every time a single-color ink composition has been deposited on the recording medium is preferable from the viewpoint of enhancing curing.

<Inkjet Recording Apparatus>

Inkjet recording apparatuses that can be used in the inkjet recording method according to the present disclosure are not particularly restricted, and the inkjet recording apparatus may be selected from known inkjet recording apparatuses, as desired. Examples of the inkjet recording apparatus include a device including an ink supplying system, a temperature sensor, and an active energy radiation source.

Examples of the ink supplying system include an ink supplying system including a storage tank that contains the ink composition according to the present disclosure, a supply piping, an ink supply tank disposed directly upstream an inkjet head, a filter, and a piezo type inkjet head.

The piezo type inkjet head is preferably capable of ejecting multi-size dots of preferably from 1 pl to 100 pl, and more preferably from 8 pl to 30 pl. The resolution is preferably from 320 dpi×320 dpi to 4,000 dpi×4,000 dpi, more preferably from 400 dpi×400 dpi to 1,600 dpi×1,600 dpi, and further preferably 720 dpi×720 dpi. Inkjet heads capable of ejection at a resolution in this range is preferable. The term "dpi" refers to the number of dots per 1 inch (2.54 cm) (dots per inch).

The inkjet recording apparatus is preferably provided with a stabilizing means for stabilizing the temperature of the ink composition. The portions where the temperature of the ink composition is to be maintained in a given temperature range are all of pipings and members from the ink tank (or from the intermediate tank, if any) to the ejection face of the ejection nozzle. In other words, the inkjet recording apparatus is preferably provided with a temperature stabilizing means capable of thermal insulation and heating of portions ranging from the ink supply tank to the inkjet head.

The method employed for controlling the temperature is not particularly restricted, and it is preferable that plural temperature sensors are provided at respective piping portions, and that heating control is performed in accordance with the flow rate of the ink composition and the environmental temperature based on the detected values of the temperature sensors. The head unit to be heated is preferably thermally shielded or thermally insulated so as to avoid thermal influence from the outside air. It is preferable that the heating unit is thermally insulated from other portions and that the heat capacity of the whole heating unit is reduced in order to reduce the starting time of the printer required for heating or to reduce a loss of heat energy.

The inkjet head is preferably an inkjet head including a nozzle plate of which a surface on the ink ejection side has been treated to have affinity for ink and on which nozzle holes are two-dimensionally arranged. Examples of the inkjet head including a nozzle plate of which a surface on the ink ejection side has been treated to have affinity for ink include piezo drive system on-demand inkjet heads manufactured by FUJIFILM DIMATIX®, Inc. Specific examples of the inkjet head include S-class and Q-class SAPPHIRE (trade name).

The nozzle plate in the inkjet head is a nozzle plate of which a surface on the ink ejection side has been treated to have affinity for ink. The nozzle plate is preferably a nozzle plate of which at least a part of a surface thereof on the ink ejection side has been treated to have affinity for ink, and more preferably a nozzle plate of which an entire surface thereof on the ink ejection side has been treated to have affinity for ink.

Examples of the method employed for treating the nozzle plate surface to have affinity for ink include a method in which one or more non-ink repellent layers are formed on at least a part of the surface of the nozzle plate.

Specifically, a structure in which a layer formed of at least one metal or metal compound selected from the group consisting of gold, stainless steel, iron, titanium, tantalum, platinum, rhodium, nickel, chromium, silicon oxide, silicon nitride and aluminium nitride is provided on at least a part of the surface of the nozzle plate on the ink ejection side is preferable. The layer formed of a metal or a metal compound is more preferably a layer formed of at least one selected from the group consisting of gold, stainless steel, iron, titanium, silicon oxide, silicon nitride, and aluminium nitride, still more preferably a layer formed of at least one selected from the group consisting of gold, stainless steel and silicon oxide, and most preferably a layer formed of silicon oxide.

In the method of treating the nozzle plate surface to have affinity for ink, the method employed for forming the metal or metal compound layer is not particularly limited, and known methods may be employed. Examples of the method include: a method in which the surface of a nozzle plate made of silicon is thermally oxidized to form a silicon oxide film; a method in which a film of an oxide of silicon or a substance other than silicon is oxidatively formed; and a method in which a metal or metal compound layer is formed by spattering. For the details of the method for treating a nozzle plate surface to have affinity for ink, U.S. Patent Application Publication No. 2010/0141709 may be referred to.

—Recording Medium—

The recording medium (also referred to as a "substrate") is not particularly restricted, and, for example, a paper material such as coated paper or normal paper not having a coated layer, a non-absorptive resin material, or a resin film obtainable by forming a resin material into a film shape or a sheet shape, may be used.

Examples of resin films include a polyethylene terephthalate (PET) film, a biaxially stretched polystyrene (OPS) film, a biaxially stretched polypropylene (OPP) film, a biaxially stretched polyamide (ONy) film, a polyvinyl chloride (PVC) film, a polyethylene (PE) film, and a triacetylcellulose (TAC) film. Examples of plastics that can be used for a recording medium include polycarbonate, acrylic resins, acrylonitrile-butadiene-styrene copolymers (ABS), polyacetal, polyvinyl alcohol (PVA), rubber, and composite materials thereof. Examples of the recording medium also include metal films, metal plates, and glass.

<Printed Matter>

The printed matter according to the present disclosure is a matter obtainable by printing by the above-described inkjet recording method according to the present disclosure, and, specifically, includes a recording medium and an image portion printed using the ink composition for inkjet recording according to the present disclosure.

The printed matter according to the present disclosure is easily handled and has a durability performance that suppresses detachment of the image for a long period since the printed matter includes an image having excellent film strength and excellent adhesion to a recording medium which is printed using the above-described ink composition according to the present disclosure.

EXAMPLES

Hereinafter, the present invention will be more specifically described with reference to Examples. However, the present invention is not limited to the following examples as long as the spirit of the invention is retained. In addition, "parts" is based on mass, unless otherwise specified.

The abbreviation "Mw" in the tables means weight-average molecular weight, and measurement of the weight-average molecular weight was performed using a gel permeation chromatograph (GPC) under the following conditions, as described above.

A calibration curve was prepared from eight samples of Standard Sample TSK Standard Polystyrene manufactured by Tosoh Corporation, which are F-40, F-20, F-4, F-1, A-5000, A-2500, A-1000, and n-propylbenzene.

<Conditions>

GPC: HLC®-8020GPC (manufactured by Tosoh Corporation)

Column: 3 columns of TSKGEL® SUPER MULTIPORE HZ-H (manufactured by Tosoh Corporation, 4.6 mm ID×15 cm)

Eluant: THF (tetrahydrofuran)

Sample concentration: 0.45% by mass

Flow rate: 0.35 ml/min

Sample injection amount: 10 μl

Measurement temperature: 40° C.

RI detector was used

<Synthesis of (Meth)Acrylic Resin>

A polymer which is a (meth)acrylic resin was synthesized following the procedures described below.

(Synthesis of Polymer P-9)

98.5 g of methyl propylene glycol was weighed out and placed in a 300 ml three-necked flask equipped with a cooling tube, and heated at 75° C. under a nitrogen atmosphere while stirring. Separately, a mixed solution was prepared by mixing 65.7 g of methyl propylene glycol, 39.5 g of 2-(2-ethoxyethoxy)ethyl acrylate, 18.8 g of isobornyl acrylate, 0.345 g of V-601 (dimethyl 2,2'-azobis(2-methyl propionate), manufactured by Wako Pure Chemical Industries, Ltd.) and 11.746 g of dipentaerythritol hexakis (3-mercaptopropionate). This mixed solution was dropped into the flask over two hours. After completion of dropping, the resultant mixture was heated at 75° C. for four hours, and 0.691 g of V-601 was added thereto, followed by further stirring at 90° C. for two hours, thereby allowing the mixture to react. The reaction liquid obtained was allowed to cool, and the cooled reaction liquid was poured into 1500 ml of hexane and purified by re-precipitation, followed by vacuum drying. About 30 g of polymer P-9 was thus obtained.

(Synthesis of Polymer P-15)

86.1 g of methyl propylene glycol was weighed out and placed in a 300 ml three-necked flask equipped with a cooling tube, and heated at 75° C. under a nitrogen atmosphere while stirring. Separately, a mixed solution was prepared by mixing 57.4 g of methyl propylene glycol, 40.4 g of phenoxyethyl acrylate, 9.0 g of methyl methacrylate, 0.345 g of V-601 (dimethyl 2,2'-azobis(2-methyl propionate), manufactured by Wako Pure Chemical Industries, Ltd.) and 11.746 g of dipentaerythritol hexakis (3-mercaptopropionate), and the mixed solution was dropped into the flask over two hours. After completion of dropping, the resultant mixture was heated at 75° C. for four hours, and 0.691 g of V-601 was added thereto, followed by further stirring at 90° C. for two hours, thereby allowing the mixture to react. The reaction liquid obtained was allowed to cool, and the cooled reaction liquid was poured into 1500 ml of hexane and purified by re-precipitation, followed by vacuum drying. About 30 g of polymer P-15 was thus obtained.

(Synthesis of Polymers P-1 to P-4, P-10, P-11, P-13, and P-14)

The synthesis of polymers P-1 to P-4, P-10, P-11, P-13 and P-14 was performed in the same manner as in the synthesis of polymer P-9, except that the type of the multifunctional thiol was changed as listed in Tables 1 to 3 and that the types of the monomers were changed to provide the repeating units listed on the above Tables 1 to 3.

(Synthesis of Polymers P-5 to P-8, P-12, and P-16 to P-27)

The synthesis of polymers P-5 to P-8, P-12, and P-16 to P-27 was performed in the same manner as in the synthesis of polymer P-9, except that the type of the monomers were changed to provide the repeating units listed on the above Tables 1 to 6.

(Synthesis of Polymer C-1)

The synthesis of polymer C-1 was performed in the same manner as in the synthesis of polymer P-9, except that the multifunctional thiol was not used, and that the monomers were changed to provide the repeating units listed on the Table 7 below.

(Synthesis of Polymer C-2)

The synthesis of polymer C-2 was performed in the same manner as in the synthesis of polymer P-9, except that the types of the monomers were changed to provide the repeating units listed on the Table 7 below.

(Synthesis of Polymers C-3 to C-6)

The synthesis of polymers C-3 to C-6 was performed in the same manner as in the synthesis of polymer P-9, except that the type of the multifunctional thiol was changed as listed in Table 7 below and that the types of the monomers were changed to provide the repeating units listed in Table 7 below.

<Preparation of Pigment Dispersion>

A pigment, a dispersant, and a polymerizable compound indicated below were mixed and stirred using a mixer (manufactured by Silverson Machines Inc., L4R) at 2,500 rpm for 10 minutes, to obtain a mixture. Thereafter, the obtained mixture was placed in a bead mill disperser DISPERMAT LS (manufactured by VMA-GETZMANN GMBH.), and dispersed using a YTZ balls with diameter of 0.65 mm (manufactured by Nikkato Corporation) at 2,500 rpm for six hours, to prepare a pigment dispersion of each color (Y, M, C, K, or W).

Yellow Pigment Dispersion (Y)

| | |
|---|---|
| Pigment: C.I. Pigment Yellow 12 | 10 parts |
| Dispersant: SOLSPERSE 32000 | 5 parts |
| Monofunctional polymerizable compound: 2-phenoxyethyl acrylate | 85 parts |

Magenta Pigment Dispersion (M)

| | |
|---|---|
| Pigment: C.I. Pigment Red 57: 1 | 15 parts |
| Dispersant: SOLSPERSE 32000 | 5 parts |
| Monofunctional polymerizable compound: 2-phenoxyethyl acrylate | 80 parts |

Cyan Pigment Dispersion (C)

| | |
|---|---|
| Pigment: C.I. Pigment Blue 15: 3 | 20 parts |
| Dispersant: SOLSPERSE 32000 | 5 parts |
| Monofunctional polymerizable compound: 2-phenoxyethyl acrylate | 75 parts |

Black Pigment Dispersion (K)

| | |
|---|---|
| Pigment: C.I. Pigment Black 7 | 20 parts |
| Dispersant: SOLSPERSE 32000 | 5 parts |
| Monofunctional polymerizable compound: 2-phenoxyethyl acrylate | 75 parts |

White Pigment Dispersion (W)

| | |
|---|---|
| Pigment: MICROLITH WHITE R-A | 20 parts |
| Dispersant: SOLSPERSE 32000 | 5 parts |
| Monofunctional polymerizable compound: 2-phenoxyethyl acrylate | 75 parts |

The details of the ingredients used for preparing the above-described pigment dispersions are as follows.

C.I. Pigment Yellow 12 (yellow pigment, manufactured by Clariant Corporation)

C.I. Pigment Red 57:1 (magenta pigment, manufactured by Clariant Corporation)

C.I. Pigment Blue 15:3 (cyan pigment, manufactured by Clariant Corporation)

C.I. Pigment Black 7 (black pigment, manufactured by Clariant Corporation)

MICROLITH® WHITE R-A (white pigment, BASF Corporation)

SOLSPERSE 32000 (polymeric dispersant, manufactured by Lubrizol Japan Limited)

Examples 1 to 29

Preparation of Ink Compositions

To the ingredients listed in Table 8 below, the ingredients (13 parts in total) in the composition described below were further added and mixed, and stirred at 1,000 rpm for 5 minutes using a mixer (manufactured by Silverson Machines Inc., L4R), to obtain a mixture. Thereafter, the obtained mixture was filtrated using a cartridge filter (product name: profile IIABO1A01014J) manufactured by Nihon Pall Manufacturing Ltd., to prepare an ink composition.

<Composition>

| | |
|---|---|
| Polymerization inhibitor: GENORAD16 (trade name; manufactured by Rahn AG) | 0.75 parts |
| Photopolymerization initiator: LUCIRIN ® TPO (2,4,6-trimethylbenzoyl diphenyl phosphine oxide, manufactured by BASF Corporation; polymerization initiator (B)) | 2.0 parts |
| Photopolymerization initiator: IRGACURE ® 184 (1-hydroxy-cyclohexyl-phenyl-ketone, manufactured by BASF Corporation; polymerization initiator (B)) | 2.2 parts |
| Photopolymerization initiator: IRGACURE ® 819 (bis(2,4,6-trimethylbenzoyl)-phenyl phosphine oxide, manufactured by BASF Corporation; polymerization initiator (B)) | 8.0 parts |
| Surfactant: BYK307 (manufactured by BYK Chemie GmbH) | 0.05 parts |

The total amount of the above-described ingredients and the ingredients listed on the Table 8 below was set to 100 parts.

In Table 7 to 8 below, "-" means non-inclusion of the ingredient. The amount of "PEA (*)" listed in Table 8 below also include the amount of PEA coming from the pigment dispersion.

—Measurement of Viscosity—

The viscosity of the prepared ink composition was measured using an RE-85L (manufactured by Toki Sangyo Co., Ltd.) at 25° C. The measurement results are also listed in Table 9 below.

Examples 30 to 31

Ink compositions were prepared in the same manner as in Example 1, except that the type of the polymerizable compound was changed as listed in Table 8 below.

Examples 32 to 34

Polymers P-15A, P-15B, and P-15C having different monomer ratios from that of polymer P-15 were synthesized in the same manner as in the synthesis of polymer P-15, except that the ratio between two monomers (the monomer for forming repeating unit 1 and the monomer for forming repeating unit 2) was changed as listed in Table 8 below.

Ink compositions were prepared in the same manner as in Example 1, except that polymer P-15 was replaced with polymer P-15A, P-15B, or P-15C, respectively.

Examples 35 to 37

Polymers P-9A, P-9B, and P-9C having different weight-average molecular weights (Mw) from that of polymer P-9 were synthesized in the same manner as in the synthesis of polymer P-9, except that the weight-average molecular weight was changed as listed in Table 8 below.

Ink compositions were prepared in the same manner as in Example 14, except that polymer P-9 was replaced with polymer P-9A, P-9B, or P-9C, respectively.

Examples 38 to 41

Ink compositions were prepared in the same manner as in Example 14, except that the addition amount of polymer P-9 was changed as listed in Table 8 below.

Example 42

An ink composition was prepared in the same manner as in Example 1, except that the multifunctional acrylate (DPHA), which is a polymerizable compound, was not used, and that the addition amount of the monofunctional polymerizable compound was changed.

Examples 43 to 46

Ink compositions were prepared in the same manner as in Example 1, except that polymer P-15 was replaced with polymer P-24, P-25, P-26, or P-27, respectively.

Comparative Examples 1 to 6

Ink compositions were prepared in the same manner as in Example 1, except that polymer P-15 was replaced with comparative polymer C-1, C-2, C-3, C-4, C-5 or C-6, as listed in Table 8 below.

TABLE 7
| (Meth)acrylic resin |
|---|
C-1 —
C-2
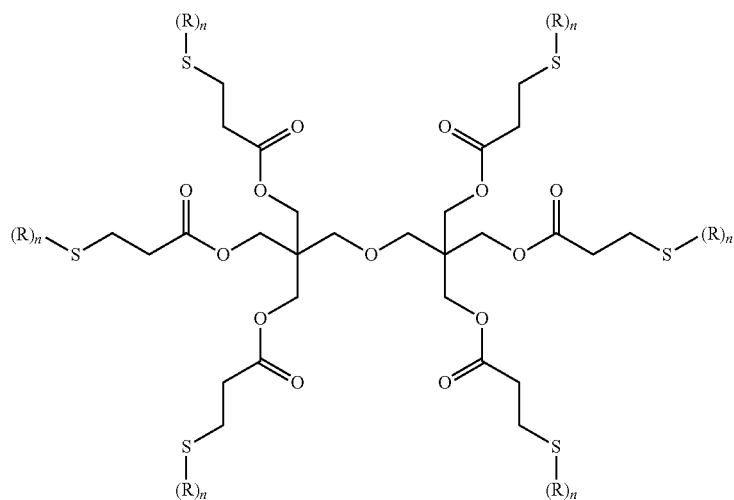
Multifunctional thiol = Hexafunctional dipentaerythritol hexakis(3-mercaptopropionate)
C-3
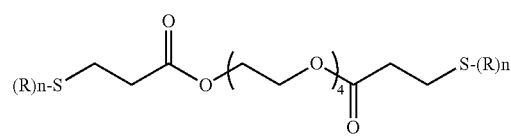
C-4
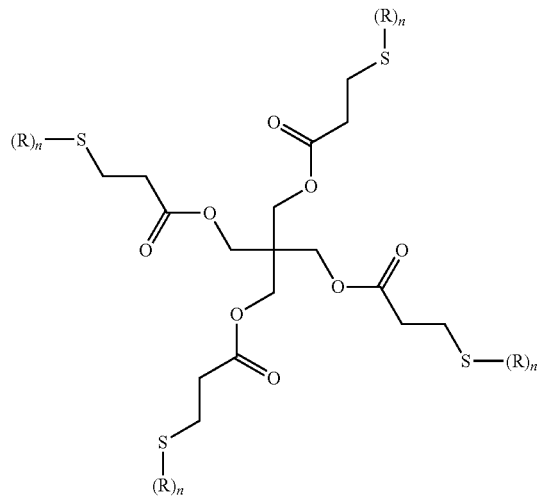
Multifunctional thiol = Tetrafunctional TABLE 7-continued C-5
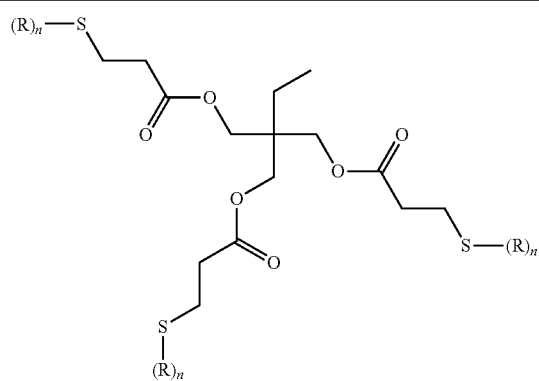
Multifunctional thiol = Trifunctional C-6
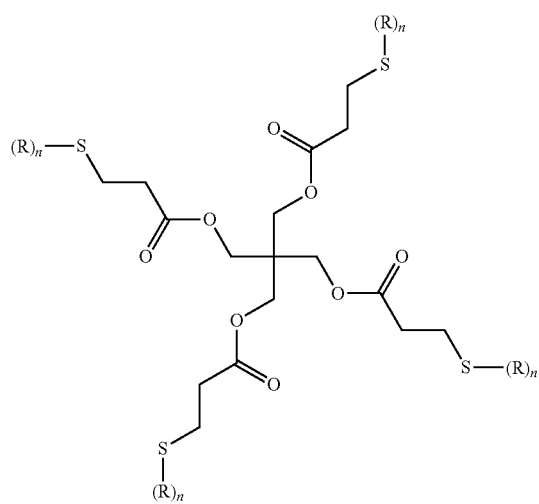
Multifunctional thiol = Tetrafunctional

| | Repeating unit of polymer chain (illustrated as (R) in the left column) | |
|---|---|---|
| | Repeating unit derived from (meth)acrylate having $C_1$—$C_8$ linear, branched, cyclic or aromatic hydrocarbon group, or (meth)acrylic acid | Repeating unit derived from (meth)acrylate including $C_9$—$C_{10}$ alicyclic hydrocarbon group |
| C-1 | Repeating unit 1 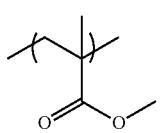 | — | — |
| C-2 | Repeating unit 1 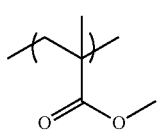 | — | — |

TABLE 7-continued

| | | | | |
|---|---|---|---|---|
| C-3 | Repeating unit 1 | — | — | |
| C-4 | Repeating unit 1 | — | — | |
| C-5 | Repeating unit 1 | Repeating unit 2 | — | |
| C-6 | Repeating unit 1 | Repeating unit 2 | — | |

—Evaluation—

For each of the ink compositions prepared in Examples and Comparative Examples, adhesion of an image to a recording medium (referred to as "adhesion to a substrate" hereinafter), film hardness according to the pencil hardness test, and ejection stability were evaluated. The results are listed in Table 9.

(i) Adhesion to Substrate

As recording media (substrates), a polycarbonate sheet (manufactured by Teijin Chemicals Ltd.; in the Table, abbreviated to "PC") and an acrylic sheet (manufactured by Japan Acryace Corporation; in the Table, abbreviated to "Acryl") were used, and adhesion of the ink (image) to the recording media was evaluated according to the following method.

First, each of the ink compositions obtained in Examples and Comparative Examples was applied, in a wet film thickness of 12 μm, to a surface of each substrate, using a K Hand Coater (bar No. 2).

Next, the coating film formed by the application was irradiated with an energy radiation, using a CSOT UV mini conveyor for experimental use equipped with a MAN250L ozone-less metal halide lamp (manufactured by GS Yuasa Power Supply Ltd.; conveyer speed: 9.0 m/min., irradiation intensity: 2.0 W/cm$^2$), whereby a cured coating film was obtained. The adhesion to the recording media was evaluated according to ISO 2409 (cross-cut method), using the cured coating film. The evaluation criteria employed is as described below. Of the evaluation ranks, ranks 0 to 1 are practically acceptable.

In the evaluation ranks 0 to 5 described below, "%" representing the detachment of cells is the ratio, in percentage, of the number of cells in which detachment is observed relative to the number of cells (25) formed by cutting the film at right angles at 1 mm intervals.

The ratio of detached cells (%)=(the number of cells in which detachment occurred/the total number of cells)×100

<Evaluation Criteria>

0: Cut edges are smooth, and all of the cells are free of detachment.

1: Small detachment is observed on the coating film at intersections of cuts, but the number of cells where detachment is observed is 5% or less of the total number of cells.

2: Detachment is observed at least in a portion along a cut edge of the coating film or at an intersection of cuts or both, and the number of cells where detachment is observed is from more than 5% of the total number of cells to 15% of the total number of cells.

3: Partial or complete detachment is observed along a cut edge of the coating film, or partial or complete detachment is observed at a variety of portions of the lattice. The number of cells where detachment is observed is from more than 15% of the total number of cells to 35% of the total number of cells.

4: Partial or complete detachment is observed along a cut edge of the coating film, or partial or complete detachment is observed at a variety of portions of the lattice. The number of cells where detachment is observed is from more than 35% of the total number of cells to 65% of the total number of cells.

5: The number of cells where detachment is observed is more than 65% of the total number of cells.

(ii) Pencil Hardness

An ink cured film prepared in the same manner as in the preparation of the ink cured film in the evaluation of the adhesion to a substrate was subjected to the pencil hardness test according to JIS K5600-5-4.

The acceptable range of the hardness of the ink composition is HB or higher, and the hardness is preferably H or higher. A printed matter that produces an evaluation result of B or lower is not preferable since the printed matter may be damaged when handled. The pencil employed was UNI® manufactured by MITSUBISHIPENCIL CO., LTD..

(iii) Ejection Stability

The ejectability of the ink at a head nozzle during inkjet recording was evaluated according to the method described below, using a commercially available inkjet recording apparatus equipped with a piezo type ink ejection head (LUXELJET® UV3600GT/XT (tradename), manufactured by Fujifilm Corporation).

A PET (polyethylene terephthalate) film (manufactured by Toray Industries, Inc.) was prepared as a recording medium (substrate), and each of the ink compositions obtained in Examples and Comparative Examples was continuously ejected onto the PET film using the inkjet recording apparatus for 60 minutes under the ejection conditions described below, and the deposited ink was irradiated with ultraviolet (UV) light (irradiation amount: 1000 mW/cm$^2$). The number of nozzles that were clogged with the ink (nozzle losses) during the 60-minute continuous ejection was determined, and evaluated acccording to the evaluation criteria described below. Ejection stability ranks A and B are practically acceptable.

<Ejection Conditions>
Number of channels: 318/head
Drive frequency: 4.8 kHz/dot
Ink droplet: 7 droplets, 42 pl
Head nozzle temperature: 45° C.

<Evaluation Criteria>
A: The number of nozzle losses is from 0 to less than 5
B: The number of nozzle losses is from 5 to less than 10
C: The number of nozzle losses is 10 or more

TABLE 8

| | (Meth)acrylic Resin (A) | | | | Polymerizable Compound (C) (parts by mass) | | | | | | | Pigment Dispersion | |
| | Polymer Species | Polymer Composition Ratio (mol %) | | Mw | Addition Amount (parts by mass) | Monofunctional | | | | | | Multi-func- tional DPHA | Addition Amount |
| | | Repeating unit 1 | Repeating unit 2 | | | IBOA | NVC | PEA(*) | CTFA | THFA | EOE OEA | | Type | (parts by mass) |
|---|---|---|---|---|---|---|---|---|---|---|---|---|---|---|
| Example 1 | P-15 | 70 | 30 | 3000 | 3 | 15 | 15 | 22 | 20 | — | — | 5 | Y | 7 |
| Example 2 | P-15 | 70 | 30 | 3000 | 3 | 15 | 15 | 16 | 20 | — | — | 5 | M | 13 |
| Example 3 | P-15 | 70 | 30 | 3000 | 3 | 15 | 15 | 22 | 20 | — | — | 5 | C | 7 |
| Example 4 | P-15 | 70 | 30 | 3000 | 3 | 15 | 15 | 16 | 20 | — | — | 5 | W | 13 |
| Example 5 | P-15 | 70 | 30 | 3000 | 3 | 15 | 15 | 29 | 20 | — | — | 5 | — | — |
| Example 6 | P-1 | 70 | 30 | 3000 | 3 | 15 | 15 | 22 | 20 | — | — | 5 | K | 7 |
| Example 7 | P-2 | 70 | 30 | 3000 | 3 | 15 | 15 | 22 | 20 | — | — | 5 | K | 7 |
| Example 8 | P-3 | 70 | 30 | 3000 | 3 | 15 | 15 | 22 | 20 | — | — | 5 | K | 7 |
| Example 9 | P-4 | 70 | 30 | 3000 | 3 | 15 | 15 | 22 | 20 | — | — | 5 | K | 7 |
| Example 10 | P-5 | 70 | 30 | 3000 | 3 | 15 | 15 | 22 | 20 | — | — | 5 | K | 7 |
| Example 11 | P-6 | 70 | 30 | 3000 | 3 | 15 | 15 | 22 | 20 | — | — | 5 | K | 7 |
| Example 12 | P-7 | 70 | 30 | 3000 | 3 | 15 | 15 | 22 | 20 | — | — | 5 | K | 7 |
| Example 13 | P-8 | 70 | 30 | 3000 | 3 | 15 | 15 | 22 | 20 | — | — | 5 | K | 7 |
| Example 14 | P-9 | 70 | 30 | 3000 | 3 | 15 | 15 | 22 | 20 | — | — | 5 | K | 7 |
| Example 15 | P-10 | 70 | 30 | 3000 | 3 | 15 | 15 | 22 | 20 | — | — | 5 | K | 7 |
| Example 16 | P-11 | 70 | 30 | 3000 | 3 | 15 | 15 | 22 | 20 | — | — | 5 | K | 7 |
| Example 17 | P-12 | 70 | 30 | 3000 | 3 | 15 | 15 | 22 | 20 | — | — | 5 | K | 7 |
| Example 18 | P-13 | 70 | 30 | 3000 | 3 | 15 | 15 | 22 | 20 | — | — | 5 | K | 7 |
| Example 19 | P-14 | 70 | 30 | 3000 | 3 | 15 | 15 | 22 | 20 | — | — | 5 | K | 7 |
| Example 20 | P-15 | 70 | 30 | 3000 | 3 | 15 | 15 | 22 | 20 | — | — | 5 | K | 7 |
| Example 21 | P-16 | 70 | 30 | 3000 | 3 | 15 | 15 | 22 | 20 | — | — | 5 | K | 7 |
| Example 22 | P-17 | 70 | 30 | 3000 | 3 | 15 | 15 | 22 | 20 | — | — | 5 | K | 7 |
| Example 23 | P-18 | 70 | 30 | 3000 | 3 | 15 | 15 | 22 | 20 | — | — | 5 | K | 7 |
| Example 24 | P-19 | 70 | 30 | 3000 | 3 | 15 | 15 | 22 | 20 | — | — | 5 | K | 7 |
| Example 25 | P-20 | 70 | 30 | 3000 | 3 | 15 | 15 | 22 | 20 | — | — | 5 | K | 7 |
| Example 26 | P-21 | 70 | 30 | 3000 | 3 | 15 | 15 | 22 | 20 | — | — | 5 | K | 7 |
| Example 28 | P-22 | 70 | 30 | 3000 | 3 | 15 | 15 | 22 | 20 | — | — | 5 | K | 7 |
| Example 29 | P-23 | 70 | 30 | 3000 | 3 | 15 | 15 | 22 | 20 | — | — | 5 | K | 7 |
| Example 30 | P-15 | 70 | 30 | 3000 | 3 | 15 | 15 | 22 | — | 20 | — | 5 | K | 7 |
| Example 31 | P-15 | 70 | 30 | 3000 | 3 | 15 | 15 | 22 | — | — | 20 | 5 | K | 7 |
| Example 32 | P-15A | 80 | 20 | 3000 | 3 | 15 | 15 | 22 | 20 | — | — | 5 | K | 7 |
| Example 33 | P-15B | 60 | 40 | 3000 | 3 | 15 | 15 | 22 | 20 | — | — | 5 | K | 7 |
| Example 34 | P-15C | 50 | 50 | 3000 | 3 | 15 | 15 | 22 | 20 | — | — | 5 | K | 7 |
| Example 35 | P-9A | 70 | 30 | 2000 | 3 | 15 | 15 | 22 | 20 | — | — | 5 | K | 7 |
| Example 36 | P-9B | 70 | 30 | 10000 | 3 | 15 | 15 | 22 | 20 | — | — | 5 | K | 7 |
| Example 37 | P-9C | 70 | 30 | 20000 | 3 | 15 | 15 | 22 | 20 | — | — | 5 | K | 7 |
| Example 38 | P-9 | 70 | 30 | 3000 | 1 | 15 | 15 | 24 | 20 | — | — | 5 | K | 7 |
| Example 39 | P-9 | 70 | 30 | 3000 | 5 | 15 | 15 | 20 | 20 | — | — | 5 | K | 7 |
| Example 40 | P-9 | 70 | 30 | 3000 | 8 | 15 | 15 | 17 | 20 | — | — | 5 | K | 7 |
| Example 41 | P-9 | 70 | 30 | 3000 | 10 | 15 | 15 | 15 | 20 | — | — | 5 | K | 7 |
| Example 42 | P-9 | 70 | 30 | 3000 | 3 | 15 | 15 | 27 | 20 | — | — | 0 | K | 7 |
| Example 43 | P-24 | 70 | 30 | 3000 | 3 | 15 | 15 | 22 | 20 | — | — | 5 | K | 7 |

TABLE 8-continued

| | | (Meth)acrylic Resin (A) | | | | Polymerizable Compound (C) (parts by mass) | | | | | | | Pigment Dispersion | |
|---|---|---|---|---|---|---|---|---|---|---|---|---|---|---|
| | | Polymer Composition Ratio (mol %) | | | Addition Amount | Monofunctional | | | | | | Multi-functional | | Addition Amount |
| | Polymer Species | Repeating unit 1 | Repeating unit 2 | Mw | (parts by mass) | IBOA | NVC | PEA(*) | CTFA | THFA | EOEOEA | DPHA | Type | (parts by mass) |
| Example 44 | P-25 | 70 | 30 | 3000 | 3 | 15 | 15 | 22 | 20 | — | — | 5 | K | 7 |
| Example 45 | P-26 | 70 | 30 | 3000 | 3 | 15 | 15 | 22 | 20 | — | — | 5 | K | 7 |
| Example 46 | P-27 | 70 | 30 | 3000 | 3 | 15 | 15 | 22 | 20 | — | — | 5 | K | 7 |
| Comparative Example 1 | C-1 | 100 | 0 | 20000 | 3 | 15 | 15 | 22 | 20 | — | — | 5 | K | 7 |
| Comparative Example 2 | C-2 | 100 | 0 | 20000 | 3 | 15 | 15 | 22 | 20 | — | — | 5 | K | 7 |
| Comparative Example 3 | C-3 | 100 | 0 | 20000 | 3 | 15 | 15 | 22 | 20 | — | — | 5 | K | 7 |
| Comparative Example 4 | C-4 | 100 | 0 | 20000 | 3 | 15 | 15 | 22 | 20 | — | — | 5 | K | 7 |
| Comparative Example 5 | C-5 | 60 | 40 | 20000 | 3 | 15 | 15 | 22 | 20 | — | — | 5 | K | 7 |
| Comparative Example 6 | C-6 | 90 | 10 | 20000 | 3 | 15 | 15 | 22 | 20 | — | — | 5 | K | 7 |

The details of the polymerizable compounds in the Table are as follows.

IBOA: isobornyl acrylate (monofunctional radically polymerizable compound: ARONIX® M-156, manufactured by TOAGOSEI CO., LTD.)

NVC: N-vinylcaprolactam (monofunctional polymerizable compound: V-CAP, manufactured by BASF Corporation)

PEA: 2-phenoxyethyl acrylate (monofunctional radically polymerizable compound: VISCOAT #192, manufactured by Osaka Organic Chemical Industry Ltd.)

CTFA: cyclic trimethylol propane formal acrylate (monofunctional polymerizable compound: SR-531, manufactured by Sartomer Japan Inc.)

THFA: tetrahydrofurfuryl acrylate (monofunctional polymerizable compound: SR-285, manufactured by Sartomer Japan Inc.)

EOEOEA: 2-(2-ethoxyethoxy)ethyl acrylate (monofunctional polymerizable compound: SR256, manufactured by Sartomer Japan Inc.)

DPHA: dipentaerythrytol hexaacrylate (multifunctional acrylate (hexafunctional radically polymerizable compound), A-DPH, manufactured by Shin-Nakamura Chemical Co., Ltd.)

TABLE 9

| | Evaluation | | | | |
|---|---|---|---|---|---|
| | Ink Viscosity | Ejection Stability | Adhesion to Substrate | | Pencil Hardness |
| | [Pa · s] | | PC | Acryl | |
| Example 1 | 16 | A | 0 | 0 | H |
| Example 2 | 16 | A | 0 | 0 | H |
| Example 3 | 16 | A | 0 | 0 | H |
| Example 4 | 16 | A | 0 | 0 | H |
| Example 5 | 16 | A | 0 | 0 | H |
| Example 6 | 26 | B | 0 | 0 | H |
| Example 7 | 26 | B | 0 | 0 | H |
| Example 8 | 26 | B | 1 | 0 | H |
| Example 9 | 26 | B | 1 | 0 | H |
| Example 10 | 16 | A | 0 | 0 | H |
| Example 11 | 16 | A | 0 | 0 | H |
| Example 12 | 16 | A | 0 | 0 | H |
| Example 13 | 16 | A | 0 | 0 | H |
| Example 14 | 16 | A | 0 | 0 | H |
| Example 15 | 26 | B | 1 | 0 | H |
| Example 16 | 20 | A | 1 | 0 | H |
| Example 17 | 20 | A | 1 | 0 | H |
| Example 18 | 20 | A | 1 | 0 | H |
| Example 19 | 20 | A | 1 | 0 | H |
| Example 20 | 16 | A | 0 | 0 | H |
| Example 21 | 16 | A | 0 | 0 | H |
| Example 22 | 16 | A | 0 | 0 | H |
| Example 23 | 16 | A | 0 | 0 | H |
| Example 24 | 16 | A | 0 | 0 | H |
| Example 25 | 16 | A | 0 | 0 | H |
| Example 26 | 16 | A | 0 | 0 | H |
| Example 28 | 16 | A | 0 | 0 | H |
| Example 29 | 16 | A | 0 | 0 | H |
| Example 30 | 16 | A | 1 | 0 | HB |
| Example 31 | 16 | A | 1 | 0 | HB |
| Example 32 | 16 | A | 0 | 0 | H |
| Example 33 | 18 | A | 0 | 0 | H |
| Example 34 | 20 | A | 0 | 0 | H |
| Example 35 | 16 | A | 0 | 0 | H |
| Example 36 | 20 | B | 0 | 0 | H |
| Example 37 | 30 | B | 0 | 0 | H |
| Example 38 | 14 | A | 1 | 1 | HB |
| Example 39 | 17 | A | 0 | 0 | H |
| Example 40 | 22 | B | 0 | 0 | H |
| Example 41 | 26 | B | 0 | 0 | H |
| Example 42 | 16 | A | 1 | 0 | HB |
| Example 43 | 16 | A | 0 | 0 | H |
| Example 44 | 16 | A | 0 | 0 | H |
| Example 45 | 16 | A | 0 | 0 | H |
| Example 46 | 16 | A | 0 | 0 | H |
| Comparative Example 1 | 60 | C | 2 | 2 | C |
| Comparative Example 2 | 30 | B | 2 | 2 | HB |
| Comparative Example 3 | 60 | C | 2 | 2 | C |
| Comparative Example 4 | 30 | B | 4 | 4 | B |
| Comparative Example 5 | 60 | C | 2 | 2 | B |
| Comparative Example 6 | 30 | B | 4 | 4 | B |

As demonstrated in Table 9, in the Examples, an increase in the viscosity of the ink composition was suppressed, and the ejection stability of the ink composition was excellent. The printed image had a favorable film strength and an excellent adhesion to a recording medium (adhesion to a substrate).

In contrast, Comparative Examples 1 to 4, in which the specific resin ((meth)acrylic resin) according to the present disclosure was not selected, produced results that are inferior particularly in the adhesion of the printed image to a substrate. Further, it was found that Comparative Example 1, in which the polymer did not include a skeleton structure derived from a multifunctional thiol, exhibited lower ejection stability and lower film strength than those of Comparative Example 2. It was also found that Comparative Example 3, in which the multifunctional thiol was bifunctional, exhibited lower ejection stability and lower film strength than those of Comparative Example 2. Comparative Example 4, in which the number of atoms in the polymer chain was more than eight, exhibited inferior results particularly in the adhesion to a substrate.

In Comparative Example 5, in which polymer C-5 including a nitrogen atom (N) as an amide in a polymer chain of a (meth)acrylic resin was used, an increase in the viscosity of the ink composition was large, the ejection stability was poor, and, also, the adhesion of an image to a substrate and the film strength were insufficient. In Comparative Example 6, in which polymer C-6 including plural —SiO— units in a polymer chain of a (meth)acrylic resin, the adhesion to a substrate was greatly inferior as in Comparative Example 4, and there is also a room for improvement of the ejection stability and film strength.

The invention claimed is:

1. An ink composition for inkjet recording, comprising:
   a (meth)acrylic resin including a skeleton structure derived from a multifunctional thiol that is trifunctional to hexafunctional and a plurality of polymer chains connected to the skeleton structure by a sulfide bond, each of the plurality of polymer chains including at least two (meth)acrylic repeating units selected from the group consisting of a repeating unit derived from a (meth)acrylate having a $C_1$-$C_8$ linear, $C_3$-$C_8$ branched, $C_3$-$C_8$ alicyclic, or $C_6$-$C_8$ aromatic hydrocarbon group, which may include an oxygen atom, a repeating unit derived from a (meth)acrylate having a $C_9$-$C_{10}$ alicyclic hydrocarbon group, and a repeating unit derived from (meth)acrylic acid, in an amount of more than 90 mol % with respect to a total amount of the repeating units in the polymer chain;
   a polymerization initiator; and
   a polymerizable compound.

2. The ink composition for inkjet recording according to claim 1, wherein the multifunctional thiol in the (meth)acrylic resin is a hexafunctional thiol.

3. The ink composition for inkjet recording according to claim 1, wherein the multifunctional thiol in the (meth)acrylic resin is at least one selected from the group consisting of dipentaerythritol hexakis (3-mercaptopropionate), dipentaerythritol hexakis (2-mercaptoacetate), and dipentaerythritol hexakis (2-mercaptopropionate).

4. The ink composition for inkjet recording according to claim 1, wherein at least one of the (meth)acrylic repeating units comprises a repeating unit derived from at least one selected from the group consisting of phenoxyethyl acrylate, 2-(2-ethoxyethoxy)ethyl acrylate, and isobornyl acrylate.

5. The ink composition for inkjet recording according to claim 1, wherein a weight-average molecular weight of the (meth)acrylic resin is from 1,000 to 30,000.

6. The ink composition for inkjet recording according to claim 1, wherein a content of the (meth)acrylic resin is from 1% by mass to 15% by mass with respect to a total mass of the ink composition.

7. The ink composition for inkjet recording according to claim 1, wherein the polymerizable compound comprises at least one monofunctional polymerizable compound.

8. The ink composition for inkjet recording according to claim 1, wherein the polymerizable compound comprises at least one selected from the group consisting of N-vinylcaprolactam, 2-phenoxyethyl acrylate, cyclic trimethylol propane formal acrylate, isobornyl acrylate, tetrahydrofurfuryl acrylate, 2-(2-ethoxyethoxy)ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, and 4-t-butylcyclohexyl acrylate.

9. The ink composition for inkjet recording according to claim 1, wherein the polymerizable compound comprises at least one multifunctional polymerizable compound.

10. The ink composition for inkjet recording according to claim 1, wherein the polymerization initiator comprises at least one selected from the group consisting of an α-aminoketone compound and an acylphosphine oxide compound.

11. The ink composition for inkjet recording according to claim 1, wherein a content of the repeating unit derived from a (meth)acrylate having a $C_1$-$C_8$ linear, $C_3$-$C_8$ branched, $C_3$-$C_8$ alicyclic, or $C_6$-$C_8$ aromatic hydrocarbon group, which may include an oxygen atom in each of the plurality of polymer chains, is 50 mol % or more with respect to the total amount of the repeating units in the polymer chain.

12. The ink composition for inkjet recording according to claim 1, wherein
    the multifunctional thiol that is trifunctional to hexafunctional is at least one compound selected from the group consisting of the following formulae (1) to (7):

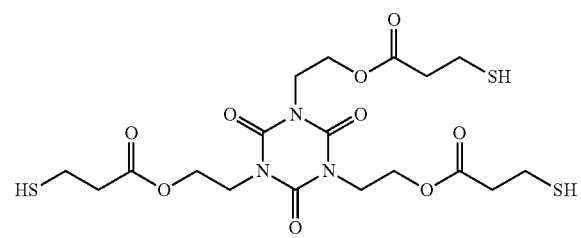

(1)

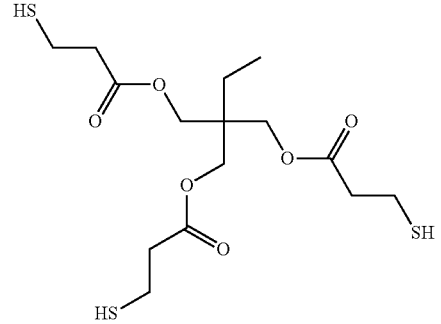

(2)

(3)

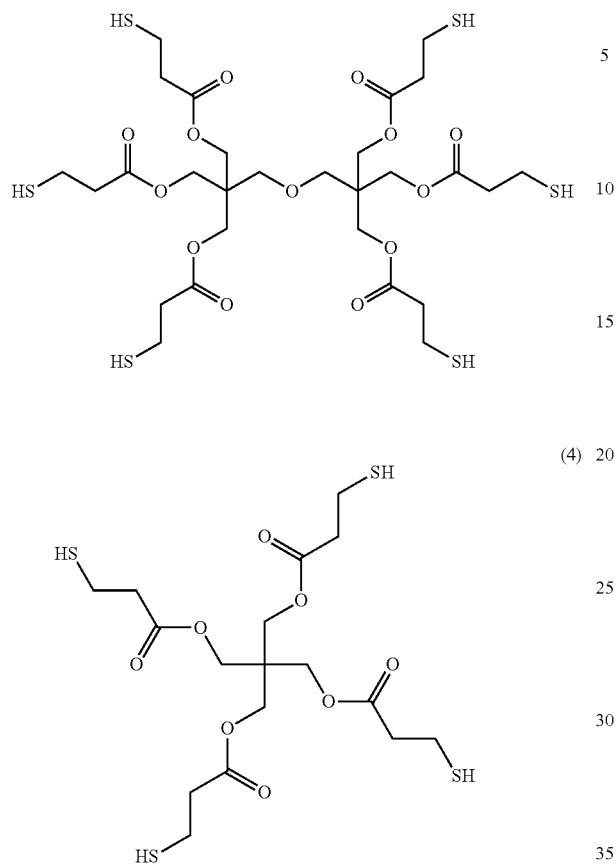

(4)

(5)

(6)

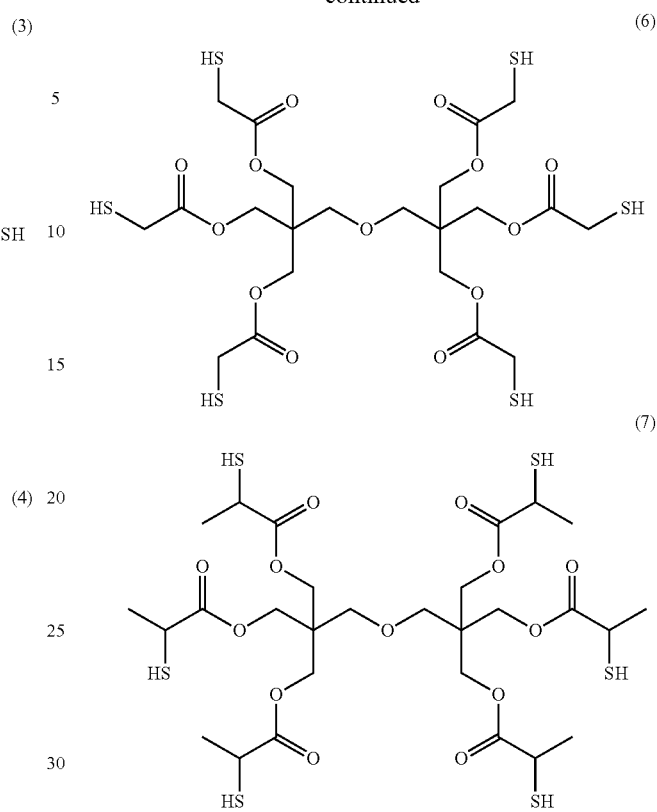

(7)

the polymerization initiator is at least one compound selected from the group consisting of aromatic ketones and acylphosphine oxide compounds, and the polymerizable compound is an acrylic acid derivative.

13. An inkjet recording method comprising:

a process of ejecting the ink composition for inkjet recording according to claim 1 onto a recording medium using an inkjet recording apparatus; and a process of irradiating the ejected ink composition with an active energy radiation, thereby curing the ink composition for inkjet recording.

14. A printed matter that is printed by the inkjet recording method according to claim 13.

\* \* \* \* \*